United States Patent

Fujimori et al.

[11] Patent Number: 5,867,497
[45] Date of Patent: *Feb. 2, 1999

[54] NETWORK SYSTEM HAVING AUTOMATIC RECONSTRUCTING FUNCTION OF LOGICAL PATHS

[75] Inventors: Junichi Fujimori; Tatsutoshi Abe, both of Hamamatsu, Japan

[73] Assignee: Yamaha Corporation, Hamamatsu, Japan

[*] Notice: This patent issued on a continued prosecution application filed under 37 CFR 1.53(d), and is subject to the twenty year patent term provisions of 35 U.S.C. 154(a)(2).

[21] Appl. No.: 584,175

[22] Filed: Jan. 11, 1996

Related U.S. Application Data

[63] Continuation-in-part of Ser. No. 388,982, Feb. 15, 1995.

[30] Foreign Application Priority Data

Feb. 24, 1994 [JP] Japan .................................. 6-049927
Feb. 24, 1995 [JP] Japan .................................. 7-060139

[51] Int. Cl.⁶ .................................................. H04L 12/50
[52] U.S. Cl. .......................................... 370/384; 370/386
[58] Field of Search ........................... 370/54, 58.1, 58.2, 370/60, 60.1, 79, 351, 355, 357, 360, 363, 377, 378, 379, 381, 382, 386, 383, 384; 395/800; 84/601, 602, 115

[56] References Cited

U.S. PATENT DOCUMENTS

| | | | |
|---|---|---|---|
| 4,320,683 | 3/1982 | Whitefield | 84/115 |
| 4,644,840 | 2/1987 | Franz et al. | 84/645 |
| 4,777,857 | 10/1988 | Stewart | 84/645 |
| 5,331,111 | 7/1994 | O'Connell | 84/602 |
| 5,376,750 | 12/1994 | Takeda et al. | 84/602 |
| 5,389,729 | 2/1995 | Hiramatsu | 84/601 |
| 5,467,345 | 11/1995 | Cutler, Jr. et al. | 370/229 |

FOREIGN PATENT DOCUMENTS

| | | |
|---|---|---|
| 0 502 423 | 9/1992 | European Pat. Off. . |
| 241429 | 2/1995 | Taiwan . |
| 251402 | 7/1995 | Taiwan . |

*Primary Examiner*—Chi H. Pham
*Assistant Examiner*—Kwang B. Yao
*Attorney, Agent, or Firm*—Graham & James LLP

[57] ABSTRACT

A network system is logically established according to path information to circulate a data throughout a complex of electronic equipments which are communicably connected to one another. Each electronic equipment has at least either of a receiver port which receives a data and a transmitter port which transmits a data. The path information is effective to enable a primary electronic equipment having a receiver port to identify a secondary electronic equipment having a corresponding transmitter port. The primary electronic equipment opens a logical path of the data connecting between its own receiver port and the corresponding transmitter port of the secondary electronic equipment according to the provided path information to thereby enable circulation of the data throughout the complex of the electronic equipments.

20 Claims, 19 Drawing Sheets

| Node No. | Unique address | Function label | Model code |
|---|---|---|---|
| 1 | aaaa.aaaa | MIDI Keyboard | AAAAAAAA |
| 2 | bbbb.bbbb | Multi Track Seqnencer | BBBBBBBB |
| 3 | cccc.cccc | 8ch.Digital Audio Mixer | CCCCCCCC |
| 4 | dddd.dddd | PCM Tone Generator | DDDDDDDD |
| 5 | eeee.eeee | FM Tone Generator | EEEEEEEE |
| 6 | ffff.abcd | Tone Generator | FFFFFFFF |

FIG. 7

Port information table (Sequencer)

| Port No. | Type | Protocol | Group code | Service item |
|---|---|---|---|---|
| 1 | RX_ONLY | multicast | d | MIDI Mesg. In (Tr.1) |
| : | : | : | : | : |
| 16 | RX_ONLY | multicast | d | MIDI Mesg. In (Tr.16) |
| 17 | TX_ONLY | multicast | 10 | MIDI Mesg. Out (Tr.1) |
| 18 | TX_ONLY | multicast | 11 | MIDI Mesg. Out (Tr.2) |
| 19 | TX_ONLY | multicast | 12 | MIDI Mesg. Out (Tr.3) |
| 50 | TX_AND_RX | transaction | d | Path Info. Manager |
| 60 | TX_AND_RX | transaction | d | Control Data In/Out |

FIG. 8

Path management table (Mixer)

| Receiver port No. | Transmitter unique address | Transmitter port No. | Transmitter model code | Path setting status |
|---|---|---|---|---|
| 1 | dddd.dddd | 10 | DDDDDDDD | 1 |
| 2 | dddd.dddd | 11 | DDDDDDDD | 1 |
| 3 | eeee.eeee | 10 | EEEEEEEE | 1 |
| 4 | eeee.eeee | 11 | EEEEEEEE | 1 |
| 5 | ffff.ffff | 10 | FFFFFFFF | 3 |
| 6 | ffff.ffff | 11 | FFFFFFFF | 3 |

FIG.9

| Path setting status | Connection State |
|---|---|
| 1 | Path established state |
| 2 | Temporary connection state under request |
| 3 | Suspended state |
| 4 | Disconnection state under request |
| 5 | Connection unable state |

FIG.12

Path management table (Mixer)

| Receiver port No. | Transmitter unique address | Transmitter port No. | Transmitter model code | Path setting status |
|---|---|---|---|---|
| 1 | dddd.dddd | 10 | DDDDDDDD | 1 |
| 2 | dddd.dddd | 11 | DDDDDDDD | 1 |
| 3 | eeee.eeee | 10 | EEEEEEEE | 1 |
| 4 | eeee.eeee | 11 | EEEEEEEE | 1 |
| 5 | ffff.abcd | 10 | FFFFFFFF | 2 |
| 6 | ffff.abcd | 11 | FFFFFFFF | 2 |

FIG.21A

Path management table (Mixer)

| Receiver port No. | Transmitter unique address | Transmitter port No. | Path setting status |
|---|---|---|---|
| 1 | dddd.dddd | 10 | 1 |
| 2 | dddd.dddd | 11 | 1 |
| 3 | eeee.eeee | 10 | 1 |
| 4 | eeee.eeee | 11 | 1 |
| 5 | ffff.ffff | 10 | 0 |
| 6 | ffff.ffff | 11 | 0 |

FIG.21B

| Path setting status | Connection state |
|---|---|
| 1 | Path established state |
| 0 | Connection unable state |

5,867,497

NETWORK SYSTEM HAVING AUTOMATIC RECONSTRUCTING FUNCTION OF LOGICAL PATHS

This application is a continuation-in-part of Ser. No. 08/388,982 filed Feb. 15, 1995.

BACKGROUND OF THE INVENTION

The present invention relates to a network system composed of a plurality of electronic equipments which are interconnected to one another through logical paths so as to construct a complex electronic musical instrument or other electronic compositions. More specifically, the invention relates to a self-constructable and reconstructable network system which can automatically restore the logical paths once the same has been programmed.

In a recent audio/video (AV) system, a plurality of audio and video equipments or components are interconnected to build up a complex AV installation. For example, a typical AV system is composed of a television set, a video tape recorder, an audio component, a karaoke machine and so on. Their input terminals and output terminals are mutually connected to each other to set up the AV system. In such a case, all members of the system are physically connected together one by one by means of a coaxial cable, a shield cable, a parallel line cable and so on.

Specifically, referring to FIG. 22, the complex electronic musical instrument is composed of several electronic musical components or units which are connected to each other through a Musical Instrument Digital Interface (MIDI), which is designed according to an international standard. In the system of FIG. 22, a keyboard 101 has a MIDI output terminal OUT connected to a MIDI input terminal of a sequencer (SEQ) 102 through a line L101. The sequencer 102 has a MIDI output terminal OUT connected to a MIDI input terminal IN of a first tone generator 104 through a line L102. The first tone generator 104 has a MIDI intermediate terminal THRU connected to a MIDI input terminal IN of a second tone generator 105 through a line L103. The second tone generator 105 has a MIDI intermediate terminal THRU connected to a MIDI input terminal IN of a third tone generator 106 through a line L104. Further, the first, second and third tone generators 104, 105 and 106 have respective output terminals AUDIO-OUTs which feed output signals to an input terminal AUDIO-IN of a mixer 103 through separate lines L105, L106 and L107. The mixer 103 produces a musical tone signal from its output terminal AUDIO-OUT. The MIDI intermediate terminal THRU provided in the first and second tone generators operates to directly output or pass an input signal received at a preceding input terminal, as it is.

In the conventional structure of FIG. 22, the plurality of the electronic components are physically interconnected by a number of cables which would require a considerable installation space. Further, once the cable lines are disconnected, it would require a laborious re-coupling work to reconstruct the same complex system. Further, in the conventional structure, the member components are serially connected to each other by the MIDI lines because a MIDI message is transferred in the form of a serial data. Such a rather redundant arrangement of the MIDI lines would share a considerable installation space. If one MIDI line is inadvertently disconnected from a circuit loop, a signal cannot be transferred to succeeding members so that the musical system may stop tone generation. Even worse, it would require a laborious repairing work to recover the disconnected line.

SUMMARY OF THE INVENTION

In view of the above noted drawbacks of the prior art, a general object of the invention is to provide a network system constructed to automatically restore logical paths to interconnect member components to thereby readily reconstruct the network. Normally, such a network system is constructed on a common physical communication line (bus). A plurality of logical paths are formed in the physical communication line based on programmed path information to circulate a data among the member components to thereby construct the network system. In such a system, generally a number of data receiving members is greater than that of data transmitting members. The path information may be programmed in the transmitting member to form logical paths directed to corresponding receiving members. However, the more the number of electronic components involved in the network system, the more the logical path information stored in the transmitting member, which may hinder quick reconstruction of the network system. In view of this, a specific object of the present invention is to provide a network system in which a receiving member stores path information for restoring a logical path to a corresponding transmitting member to reconstruct a network system when a plurality of electronic components are integrated altogether. For example, in case that one transmitter member transmits a data to ten receiver members, that transmitter member does not store path information concerning the ten receiver members, but each of the ten receiver members does store path information concerning that transmitter member. By such a construction, the transmitter member is prevented from overloading of the logical path information.

In one form, the inventive network system comprises a plurality of electronic equipments, means for communicably connecting the electronic equipments to one another to form a network, and means for providing path information effective to construct logical paths in the network, wherein each electronic equipment has at least either of a receiver port and a transmitter port, and wherein an electronic equipment having a receiver port comprises means for memorizing the path information which specifies another electronic equipment having a corresponding transmitter port, and means for reconstructing a logical path which logically connects between the receiver port and the corresponding transmitter port according to the memorized path information.

In another form, the inventive network system comprises a plurality of electronic equipments, means for communicably connecting the electronic equipments to build up a complex electronic musical instrument, and providing means for providing path information effective to construct logical paths within the complex electronic musical instrument, wherein each electronic equipment has at least either of a receiver port and a transmitter port, and wherein an electronic equipment having a receiver port comprises means for identifying another electronic equipment having a corresponding transmitter port according to the path information, and means for reconstructing a logical path which logically connects between the receiver port and the corresponding transmitter port.

In a further form, the inventive network system can be logically established according to path information to circulate a data throughout a complex of electronic equipments which are communicably connected to one another. The system comprises means programmed in each electronic equipment for forming therein either of a receiver port which receives a data and a transmitter port which transmits a data, providing means for providing path information effective to enable a primary electronic equipment having a receiver port to identify a secondary electronic equipment having a corresponding transmitter port, and means programmed in the primary electronic equipment for opening a logical path of the data connecting between its own receiver port and the corresponding transmitter port according to the provided path information to thereby enable circulation of the data throughout the complex of the electronic equipments.

In a different form, the inventive method reconstructs a logical network within a complex of electronic equipments which are physically connected to one another and each of which has at least either of a receiver port and a transmitter port. The method comprises the steps of providing path information to a primary electronic equipment having a receiver port to enable the same to identify a secondary electronic equipment having a corresponding transmitter port, and restoring a logical path connecting between the receiver port and the corresponding transmitter port to thereby reconstruct the logical network.

According to the present invention, whenever the electronic equipments are physically connected altogether, logical paths are restored according to the programmed path information to readily reconstruct the network system. Once the network system is disassembled, the same is readily restored in a reassembling work. Accordingly, a set of disassembled electronic equipments can be freely transported and relocated at a desired place such as a public performance stage. The set of the electronic equipments or components are connected to a common communication cable for reassembling. Upon power-on or resetting, the logical paths are automatically restored within the communication cable to reconstruct the network system. For example, if ten members of the receiving equipments receive data from one member of the transmitting equipment, the transmitting equipment does not store logical path information of the ten receiving members, but each of the ten receiving members stores the logical path information of the one transmitting member, thereby avoiding the logical path information from concentrating to the transmitting member. Further, a substitute component can be accepted as a right member of the network system in place of a true component as far as the substitute component is functionally equivalent to the true component. Still further, the logical path information is stored in the receiver member rather than the transmitter member. By such an arrangement, the total data amount of path information can be spread over the receiver members of the network to thereby facilitate quick booting of the system. Moreover, the path information can be reserved in a portable memory medium which can be brought into different places such as studios which are installed with a group of similar electronic equipments. The memory medium is loaded into a network management member involved in each group to thereby reconstruct the same network system at the different studios. Additionally, in the inventive network system, individual members are not serially connected in contrast to the MIDI network. Therefore, even if one electronic equipment is physically disconnected from the network system, succeeding equipments still can receive a data to thereby prevent serious malfunction of the system.

BRIEF DESCRIPTION OF DRAWINGS

FIG. 7 is a table diagram listing port information of one node member composed of a sequencer.

FIG. 8 is a table diagram showing a path management table stored in one node member composed of a mixer.

FIG. 9 is a table diagram listing various path setting statuses.

FIG. 12 is a table diagram showing an updated path management table.

FIGS. 21A and 21B are table diagrams showing a path management table and a path setting status, respectively, in the second embodiment.

DETAILED DESCRIPTION OF EMBODIMENTS

Figure 1:
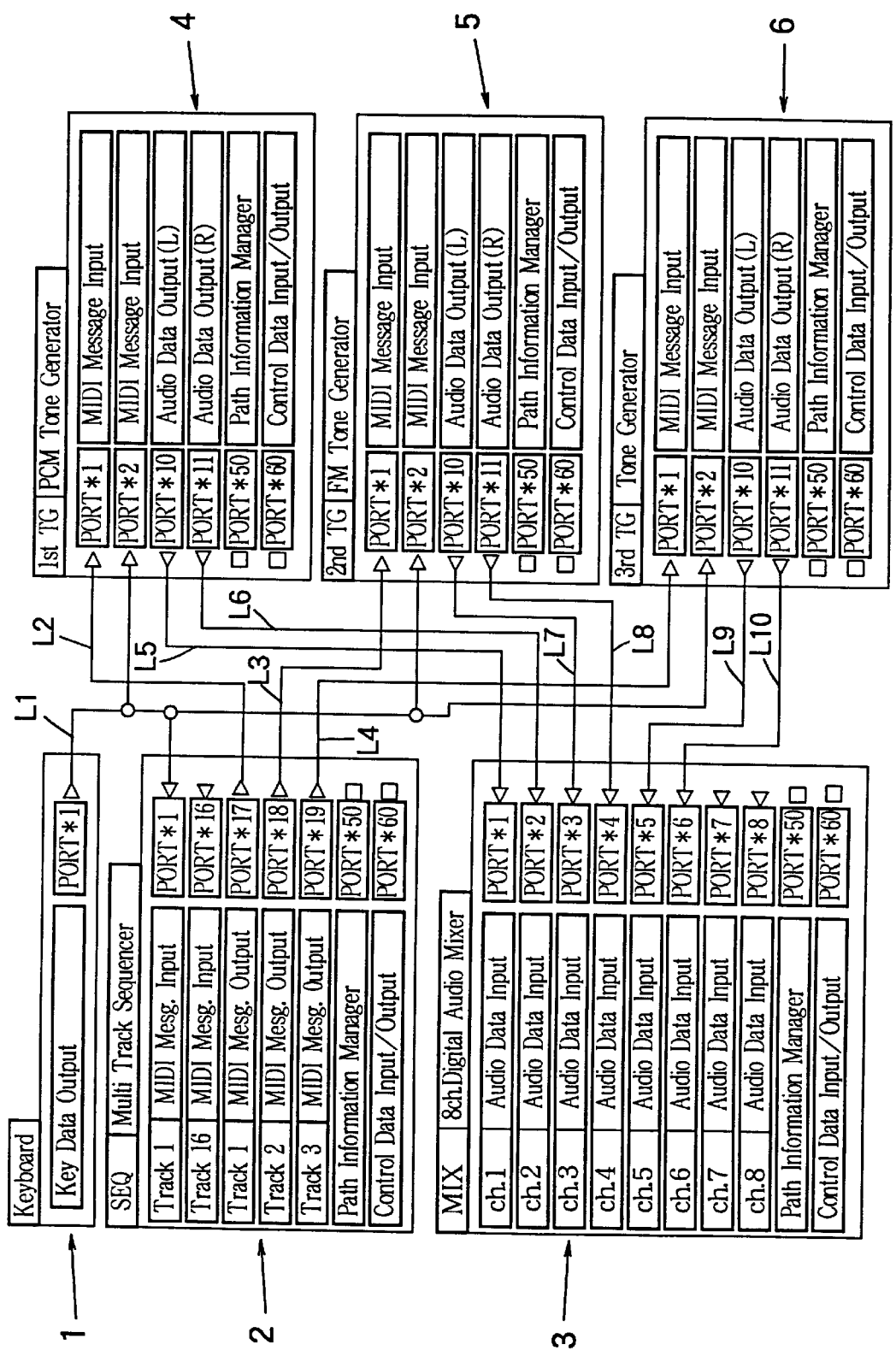
FIG. 1 is a block diagram showing a first embodiment of the inventive network system, which constitutes a complex electronic musical instrument.

Referring to FIG. 1, a network system of electronic musical components are built up according to the invention. The FIG. 1 network system is functionally equivalent to the FIG. 22 network of the hybrid electronic musical instrument. The inventive network system has logical paths indicated by lines L1–L10 which are not physical connection lines, but are virtual connection lines established in the network system.

The network system contains various members 1–6 which are allocated to respective nodes of a network and which have specific functions or roles. In this embodiment, these members include a keyboard 1, a sequencer (SEQ) 2, a mixer (MIX) 3, a first tone generator (1st TG) 4, a second tone generator (2nd TG) 5 and a third tone generator (3rd TG) 6. The keyboard 1 has a transmitter port *1 for outputting a key code data. The sequencer 2 of multi track type has an input track 1 and a corresponding receiver port *1 which receives a MIDI message input, and an input track 16 and a corresponding receiver port *16 which receives a MIDI message input. Though not shown in the figure, the sequencer 2 has input tracks 2–15 and corresponding receiver ports. Further, the sequencer 2 has an output track 1 and a corresponding transmitter port *17 for transmitting a MIDI message output, an output track 2 and a corresponding transmitter port *18 for transmitting a MIDI message output, and an output track 3 and a corresponding transmitter port *19 for transmitting a MIDI message output. Moreover, the sequencer 2 is provided with a path information manager and a corresponding transmitter/receiver port *50, and a controller and a corresponding transmitter/receiver port *60 which transmits a control data output and receives a control data input.

The mixer 3 of eight-channel digital audio type has channels 1–8 and corresponding receiver ports *1–*8 which receive respective audio data inputs. Further, the mixer 3 is provided with a path information manager and a corresponding transmitter/receiver port *50, and a controller and a corresponding transmitter/receiver port *60 which transmits a control data output and receives a control data input.

The first tone generator 4 of PCM type has a pair of receiver ports *1 and *2 which receive respective MIDI message inputs. Further, the PCM tone generator 4 has a pair of transmitter ports *10 and *11 which transmit left and right audio data outputs, respectively. Moreover, the PCM tone generator 4 is provided with a path information manager and a corresponding transmitter/receiver port *50, and a controller and a corresponding transmitter/receiver port *60 which transmits a control data output and receives a control data input. On the other hand, the second tone generator 5 is an FM type which has a similar port structure as that of the PCM tone generator 4. The third tone generator 6 may be a PCM type, FM type or else, and has a similar port structure as that of the first tone generator 4. Though not explicitly shown in the figure, these members 1–6 may have additional ports. In these members 1–6, the port is formed and operated by an independent program separately from the remaining functional parts which are operated by an application program.

In the network system composed of the various members 1–6, the logical path L1 is established to connect the transmitter port *1 of the keyboard 1 to those of the receiver port *1 of the sequencer 2, the receiver port *2 of the first tone generator 4, the receiver port *2 of the second tone generator 5 and the receiver port *2 of the third tone generator 6. The logical path L2 connects the transmitter port *17 of the sequencer 2 to the receiver port *1 of the first tone generator 4. The logical path L3 connects the transmitter port *18 of the sequencer 2 to the receiver port *1 of the second tone generator 5. The logical path L4 connects the transmitter port *19 of the sequencer 2 to the receiver port *1 of the third tone generator 6. Further, the logical path L5 connects the transmitter port *10 of the first tone generator 4 to the receiver port *1 of the mixer 3. The logical path L6 connects the transmitter port *11 of the first tone generator 4 to the receiver port *2 of the mixer 3. The logical path L7 connects the transmitter port *10 of the second tone generator 5 to the receiver port *3 of the mixer 3. The logical path L8 connects the transmitter port *11 of the second tone generator 5 to the receiver port *4 of the mixer 3. The logical path L9 connects the transmitter port *10 of the third tone generator 6 to the receiver port *5 of the mixer 3. The last logical path L10 connects the transmitter port *11 of the third tone generator 6 to the receiver port *6 of the mixer 3.

Figure 22:
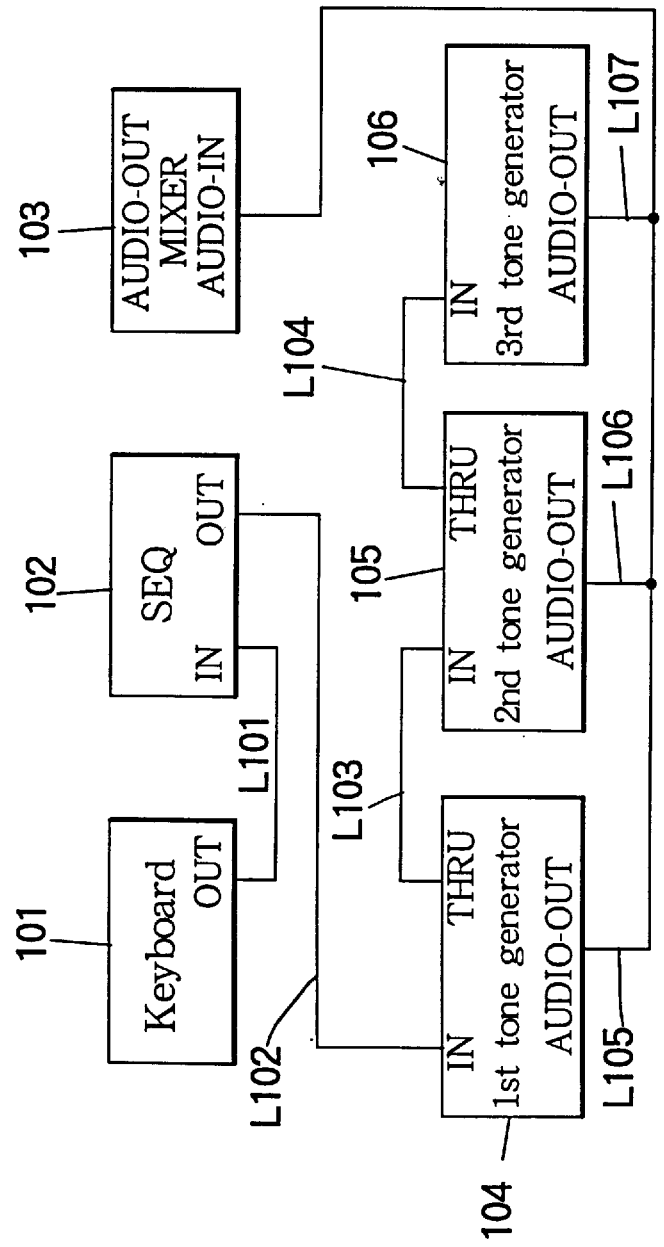
FIG. 22 is a block diagram showing a conventional network system of a complex electronic musical instrument.

By such a manner, the logical paths L1–L10 interconnect the ports of the members 1–6 with each other to build up the network system which is functionally equivalent to the FIG. 22 hybrid structure of the electronic musical instrument. These logical paths are virtual data transfer lines. The logical path is functionally established such that one transmitter port broadcasts a data output together with a group code or group address while a multiple of receiver ports assigned the same group address can commonly receive the broadcasted data output. Stated otherwise, the multiple of the receiver ports can admit the data output which is transmitted to the logical paths from the single transmitter port. More importantly, the logical paths are initially set or programmed by a user to build up the network, and logical path information thereof is stored in the receiver port rather than the transmitter port. The initial or original paths can be readily restored at booting or resetting of the system so as to reconstruct the network. Further, the logical path information may be reserved in a portable memory medium such as a floppy disk. The memory medium can be loaded into a specific node member which functions as a network management unit. The logical path information is downloaded into the network management unit so as to construct the network system.

Figure 2:
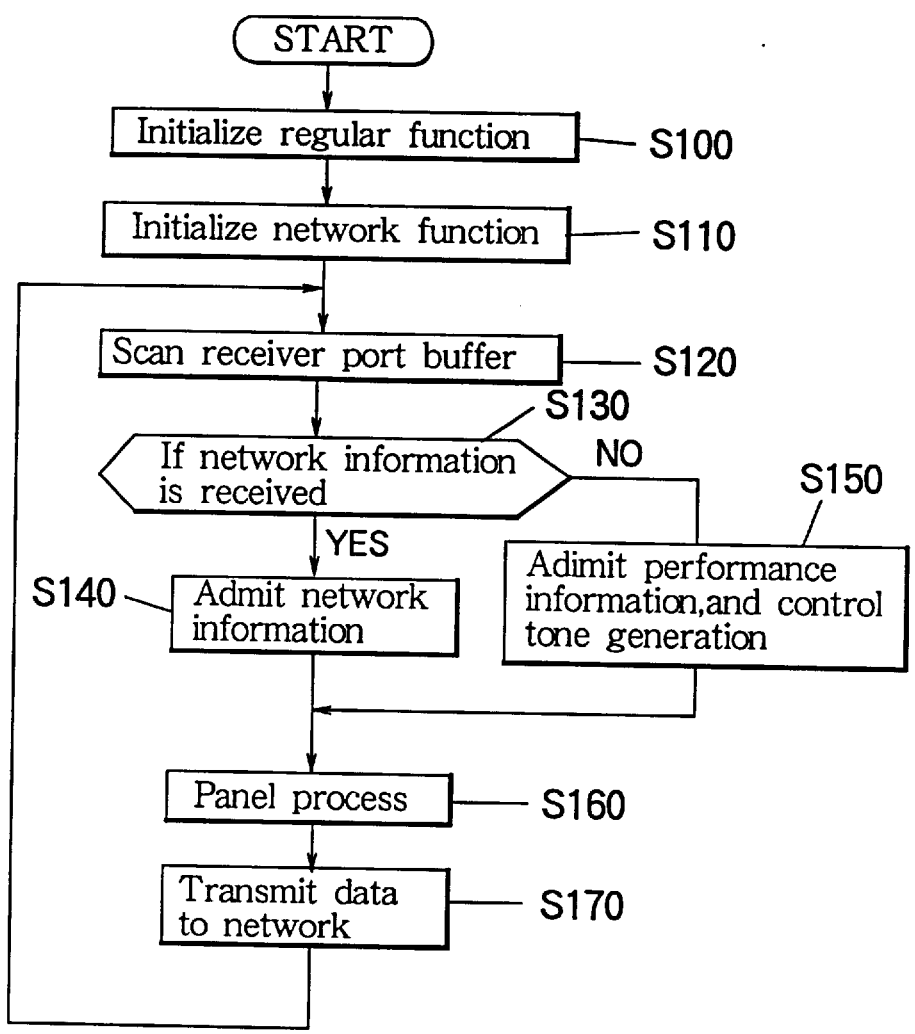
FIG. 2 is a flowchart showing a main routine of the inventive network system.

Next, the detailed description is given for operation of the inventive network system in conjunction with the flowcharts. FIG. 2 shows a main routine executed by each node member exemplified by the tone generator involved in the inventive network system. In the main routine, upon power-on to boot the system, Step S100 is undertaken to initialize its tone generating module function. Namely, initialization of the regular function is conducted such as a damp process to prevent generation of an abnormal tone. Then, Step S110 is undertaken to recognize its own node address, to identify other node members, and to conduct an initialization of the network function which will be described later in detail. Further, Step 120 is undertaken to scan its receiver port buffer which receives a data from the network. Subsequently, Step S130 is undertaken to check as to if the received data relates to network information other than performance information. In case of YES, Step S140 is undertaken to admit the network information effective to manage the network operation. In case of NO, Step S150 is undertaken to admit the performance information effective to control sounding and silencing operation of the tone generator. In Step S150, the tone generator performs its regular function. In similar manner, other node members perform their own regular functions in corresponding Steps. After Step S140 or S150 is finished, subsequent Step S160 is undertaken to carry out a panel process such that the user manually sets an operation panel to program logical paths into the network. By this panel process, the respective node member acquires a path management table. Thereafter, the logical paths can be readily reconstructed according to the path management table. Lastly, Step S170 is undertaken to transmit a desired data to the network. The data is transmitted to the network through the port which is virtually formed according to an independent port program. On the other hand, the data itself is produced by an application program, and is fed to the port. Each node member has a port information table which prescribes a protocol of each port. A transmitter port having a multicast protocol broadcasts the data together with a corresponding group address or group code rather than specifying an individual address of a destined member. Thereafter, the routine returns to Step S120 to thereby repeat the cycle of Steps S120–S170.

Figure 4:
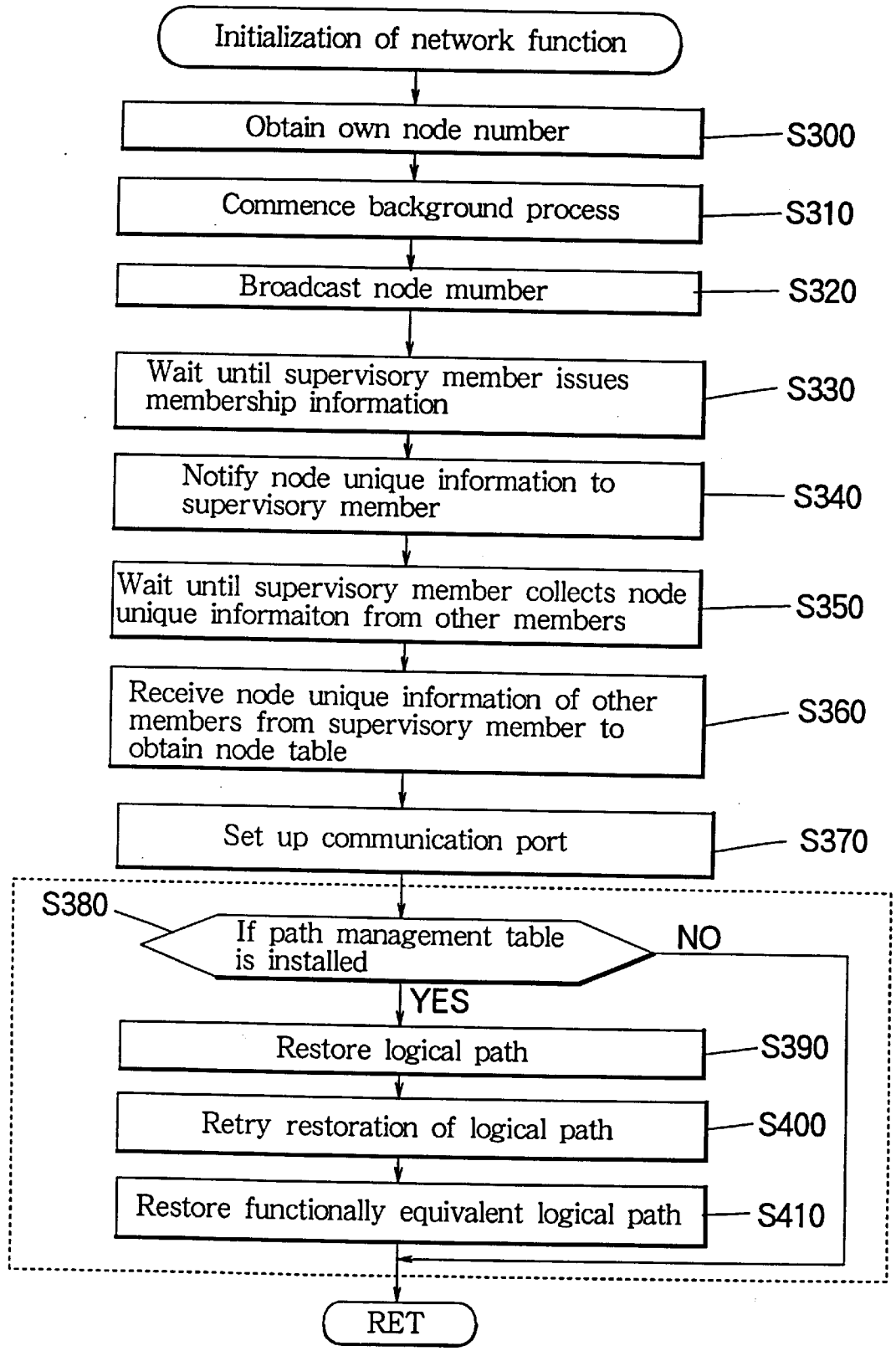
FIG. 4 is a flowchart showing an initialization process of the network system.

Next, FIG. 4 is a flowchart showing detail of the initialization process of the network function executed in the Step S110 of the main routine. First, Step S300 is undertaken when the system is activated so that each node member recognizes its own node number according to a specific algorithm. Then, Step S310 is undertaken to commence a background process which will be described later in detail. Briefly, a supervisory or initiative member is designated in the background process. The designated member watches data packets broadcasted or transmitted from other members and circulating the network so as to collect node numbers of other members from the data packets. Otherwise, the supervisory member passes the data packets to a higher rank unit, or performs various tasks in response to a service demand contained in the data packets. In subsequent Step S320, each node member broadcasts its own node number which is recognized at Step S300 to the network. The supervisory member or initiative member collects the broadcasted node number data and records the same. Further, the initiative member recognizes the membership of the network system to thereby broadcast a first ready signal packet which indicates completion of preparation of membership information. For this, Step S330 is undertaken to stand by until the first ready signal packet is issued from the initiative member. A relatively nonbusy member is automatically designated as the initiative or supervisory member among all the members involved in the network system according to so designed algorithm.

Then, Step S340 is undertaken upon the issue of the first ready signal packet which indicates the completion of the preparation of the membership information such that the individual member notifies its own node unique information to the initiative member through the network. The node unique information contains a unique address, a function label and a model code of the individual member. The unique address indicates a unique machine code of an electronic component that is the individual member. The function label indicates a performance function of the electronic component or equipment. The model code indicates a general or higher classification of the electronic equipment. The unique address is specific to a lower class of the electronic equipment, while the model code is generic to lower classes of the electronic equipment having a different structure but an equivalent function.

Figures 5, 6:
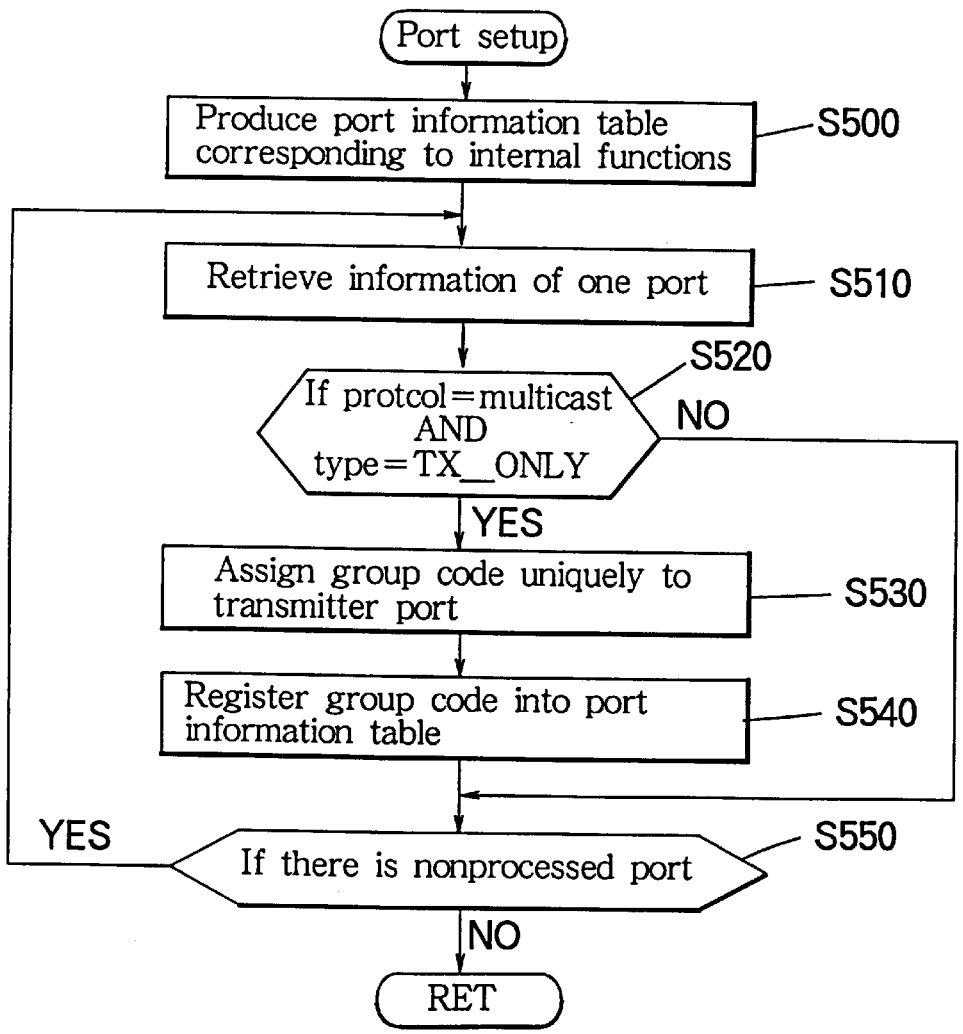
FIG. 5 is a table diagram showing a node table of the network system.
FIG. 6 is a flowchart showing a port setup process at each node member of the network system.

FIG. 5 shows a node table which lists the node unique information of all the node members. For example, the node member 1 has a unique address "aaaaaaaa", a function label "MIDI KEYBOARD", and a machine model code "AAAAAAAA". The initiative node member collects the node unique information from all of the node members to thereby broadcast a second ready signal packet which indicates completion of the node table. In this regard, Step S350 is undertaken to stand by until the initiative member finishes the collection of all the node unique information. Upon the issue of the second ready signal packet, Step S360 is undertaken so that each member receives the node unique information of other members from the initiative member to thereby store the node table shown in FIG. 5, which is commonly owned by all the members.

Next, Step S370 is undertaken such that each member forms transmitter and receiver ports according to an installed program. Consequently, each member produces a port information table as shown in FIG. 7, which lists a port number, a type of transmitter and/or receiver, a protocol, a group code and a service item. In Step S370, each transmitter port is assigned with a unique group code if the same has the multicast protocol as will be described later in detail. Then, Step S380 is undertaken to check as to if the individual member has its own path management table as shown in FIG. 8. In case of YES, Step S390 is undertaken to restore logical paths according to the path management table.

Further, Step S400 is undertaken to retry restoration of the logical paths when Step S390 fails to open the logical paths due to missing of data packets or nonresponse from other parties. Further, Step S410 is undertaken when a logical path is not restored even by the retrial of Step S400 so as to connect that logical path to a functionally equivalent machine instead of a true machine which is not found in the member of the network system. Then, the routine returns as in the case where the check result of Step S380 is held NO. When an additional or substitutional member is newly involved in the network system, such a member initially does not have its own path management table. A secondary member having no receiver port may not execute Steps of S380–S410 as enclosed by the dashed line in the figure.

Next, FIG. 6 shows a detail of the port setup process executed in the Step S370 of the network initialization process. In this process, Step S500 is undertaken such that the individual member produces the port information table according to its own internal program. For example, the sequencer of the node member 2 produces its own port information table as shown in FIG. 7. Particularly, the group code is given by following steps. Namely, Step S510 is undertaken to retrieve information of one port (for example, port *1) from the port information table. Step S520 is undertaken to check as to if the protocol indicates "multicast" and the port type indicates "transmission only (TX_ONLY)" according to the retrieved information. In case of YES, Step S530 is undertaken to assign an individual group code to that transmitter port of the multicast type. Further, Step S540 is undertaken to register the acquired group code into the port information table. For example, as shown in FIG. 7, the port information table is filled with a group code "10" for the transmitter port *17 of the multicast protocol. Then, Step S550 is undertaken to check as to if there still remains a nonprocessed port. In case of YES, the routine backs to Step S510 to thereby repeatedly assign group codes to all of the transmitter ports of the multicast type. After all of the ports are processed, the check result of Step S550 turns NO to thereby return. On the other hand, if the check result of Step S520 is found NO, the routine jumps to Step S550. In the port information table shown in FIG. 7, the mark "d" indicates that the corresponding port has a blank group code or an ineffective group code.

Figure 3:
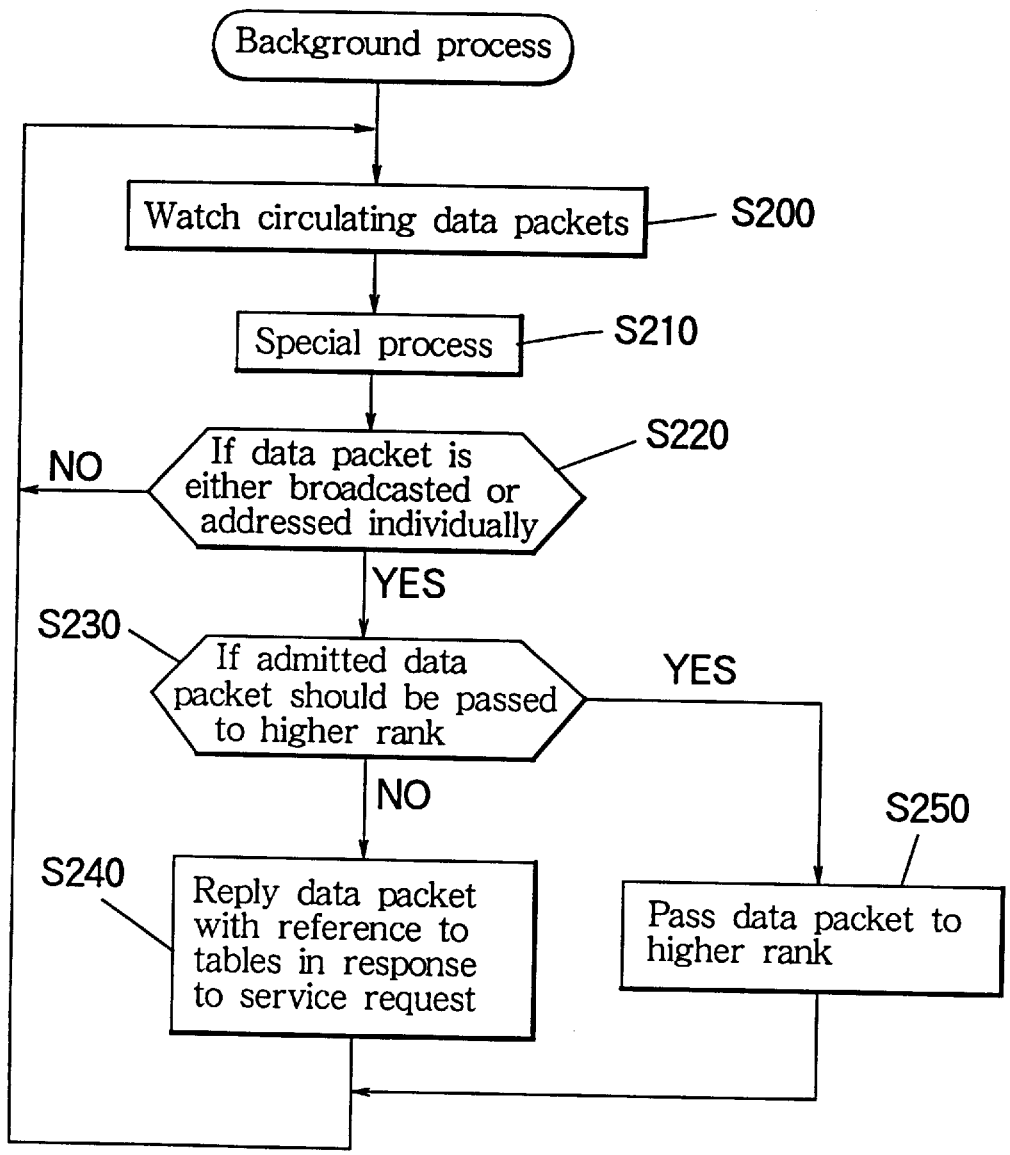
FIG. 3 is a flowchart showing a background process in the network system.

As described briefly before, Step S310 of the initialization routine commences the background process. In detail, as shown in FIG. 3, Step S200 is undertaken to watch circulating data packets. Step S210 is undertaken to carry out a special process. In this process, the initiative member designated to the supervisory member collects all the node numbers and the associated node unique information from broadasted data packets. However, other node members than the initiative member may not execute this special process. Further, Step S220 is undertaken such that the individual member checks as to if the circulating data packet is either broadcasted and addressed thereto. In case of YES, subsequent Step S230 is undertaken to check as to if the admitted data packet should be passed to a higher rank unit. In case of NO, subsequent Step S240 is undertaken such that the node member issues a reply data packet concerning itself with reference to various installed tables in response to a service demand contained in the received data packet. Particularly, the node member transmits a reply data packet in response to an inquiry demand concerning the port type for use in settings of logical paths, or in response to a user request for the port information table. On the other hand, if the check result of Step S230 is found YES, Step S250 is undertaken to pass the received data packet to the higher rank unit. Further, if the check result of Step S220 is found NO, the process backs to Step S200 as in the case where Step S240 or S250 is finished, thereby repeating the Steps S200 through S220 of the aforementioned background process.

Figure 10:
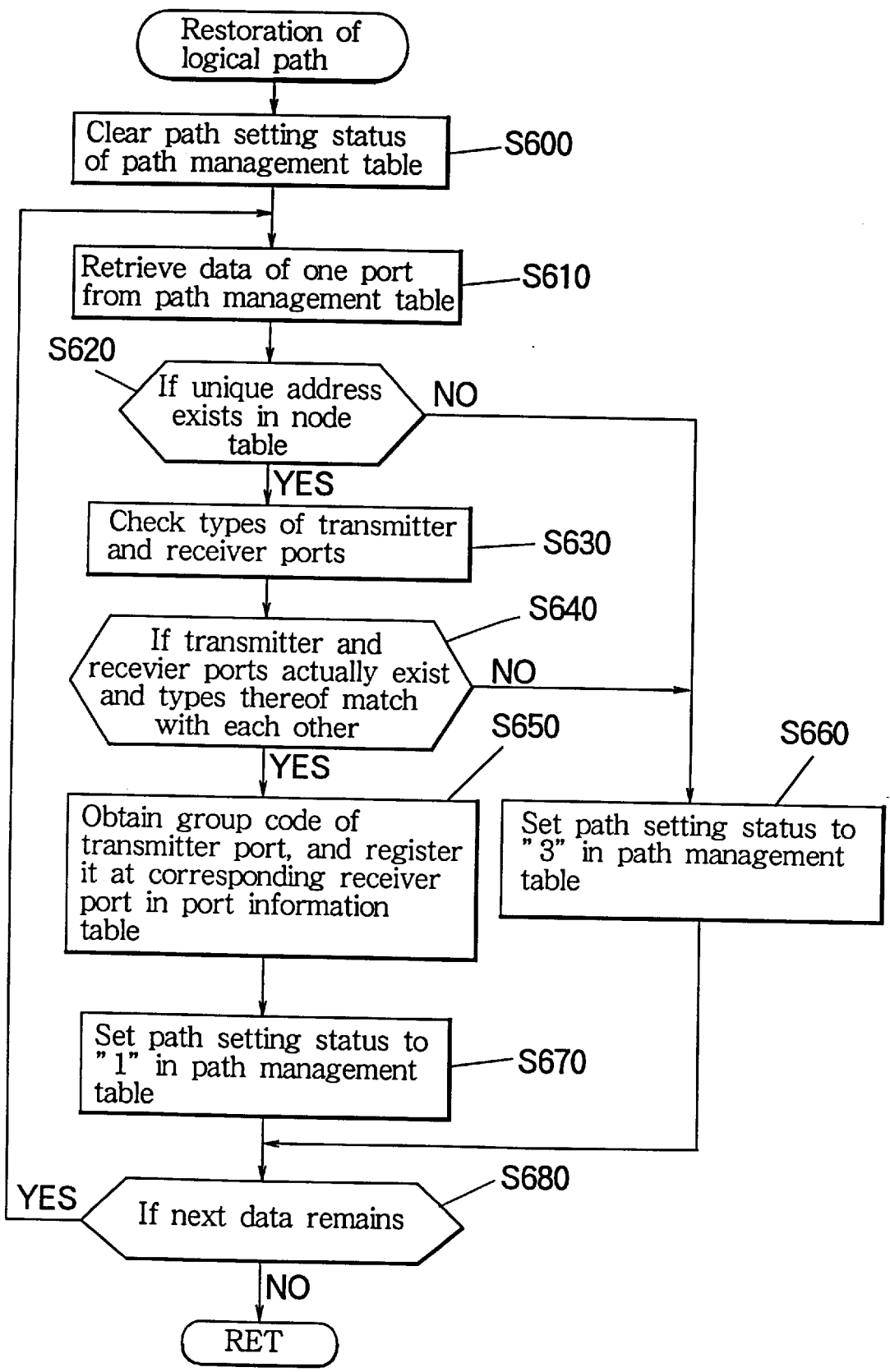
FIG. 10 is a flowchart showing a logical path restoration process.

Next, FIG. 10 shows details of the logical path restoration process or path opening process. In this process, Step S600 is undertaken such that the individual node member clears old path settings of its own path management table. For example, the mixer of the node member 3 has the path management table shown in FIG. 8, and clears a path setting status at a rightmost column of the table in Step S600. The following steps will be described specifically in conjunction with the path management table of FIG. 8. Step S610 is undertaken to retrieve a first row of the data corresponding to the receiver port *1 from the path management table. Then, Step S620 is undertaken to check as to if a specified unique address of a corresponding transmitter member is found in the node table. For example, according to the first row of the path management table shown in FIG. 8, the receiver port *1 should be connected to a transmitter member having a unique address "dddd dddd". Thus, Step S620 is undertaken to check as to if an electronic instrument having this unique address is actually involved in the network system. Then, the process advances to Step S630 when it is confirmed that the electronic instrument having this unique address actually exists in the network system.

In Step S630, check is made as to types required to the transmitter and receiver ports. Further, Step S640 is undertaken to check as to if ports having the required types exist in the transmitter and receiver members connected to each other. This check is conducted with reference to the node table which is commonly shared by the respective node members and other tables. Namely, the node table is searched to find out that the node member 4 has a unique address "dddd dddd". Further, the port information table is checked so that the receiver member confirms existence of its own receiver port *1. Further, it is recognized that the receiver port *1 is a multicast type. With regard to a corresponding transmitter port, since the path management table indicates the unique address "dddd dddd", the transmitter member is identified as the PCM tone generator 4 with reference to the node table. Thus, it is confirmed that the counter port is a transmitter port of the PCM tone generator. Further, this transmitter port is identified as a transmitter port *10 with reference to the path management table (It should be noted that the port *10 is different from group code 10 appering in the FIG. 7 table). Then, the port information table of the PCM tone generator is checked so that it is confirmed that the port *10 is the multicast type. Consequently, the receiver port *1 of the mixer and the transmitter port *10 of the PCM tone generator are identified as the correct parties connected to each other by the logical path. Further, the protocol type is matched between the receiver port *1 and the transmitter port *10, thereby proceeding to Step S650.

In Step S650, the receiving member acquires the group code assigned to the identified transmitter port with reference to the port information table of the transmitting member. The acquired group code is registered in the port information table of the receiving member. Consequently, the same group code is assigned to the pair of the corresponding transmitter and receiver members. By this, the transmitter port broadcasts a data together with the group code, while the corresponding receiver port can pick up the broadcasted data by discriminating the attached group code. Then, Step S670 is undertaken to set the path setting status to "1" in the path management table. As listed in FIG. 9, the status "1" indicates that the logical path is established or opened from the receiver port to the transmitter port.

On the other hand, the path setting status is set to "3" in Step S660, if the check result of Step S620 shows that the unique address is not found in the node table, or if the check result of Step S640 fails to recognize an existence of a corresponding transmitter port or shows that the protocol type is not matched. As shown in FIG. 9, the status "3" indicates that the logical path is not yet established and is therefore suspended. In such a case, the process advances to Step S680 as in the case where Step S670 is finished. In Step S680, check is made as to if a next data exists in the path management table. In case of YES, the process backs to Step S610 to thereby repeat the logical path restoration process. In case of NO, the routine simply returns.

An example is given where the check result of Step S620 shows that the unique address does not exist in the node table. Referring to the path management table shown in FIG. 8, the receiver port *5 designates a unique address "ffff ffff" as a corresponding transmitter node member. However, this unique address is not found in the common node table shown in FIG. 5. In such a case, the routine branches from Step S620 to Step S660 as described above. In this case, the logical path is forcibly connected to a substitute equipment which has the same function as that identified by the unique address, provided that such a substitute equipment is involved in the network system. For this, the path setting status is set to "3" indicative of the suspended state in the path management table. By such a process, the node member composed of the mixer completes the path management table as shown in FIG. 8.

Figure 11:
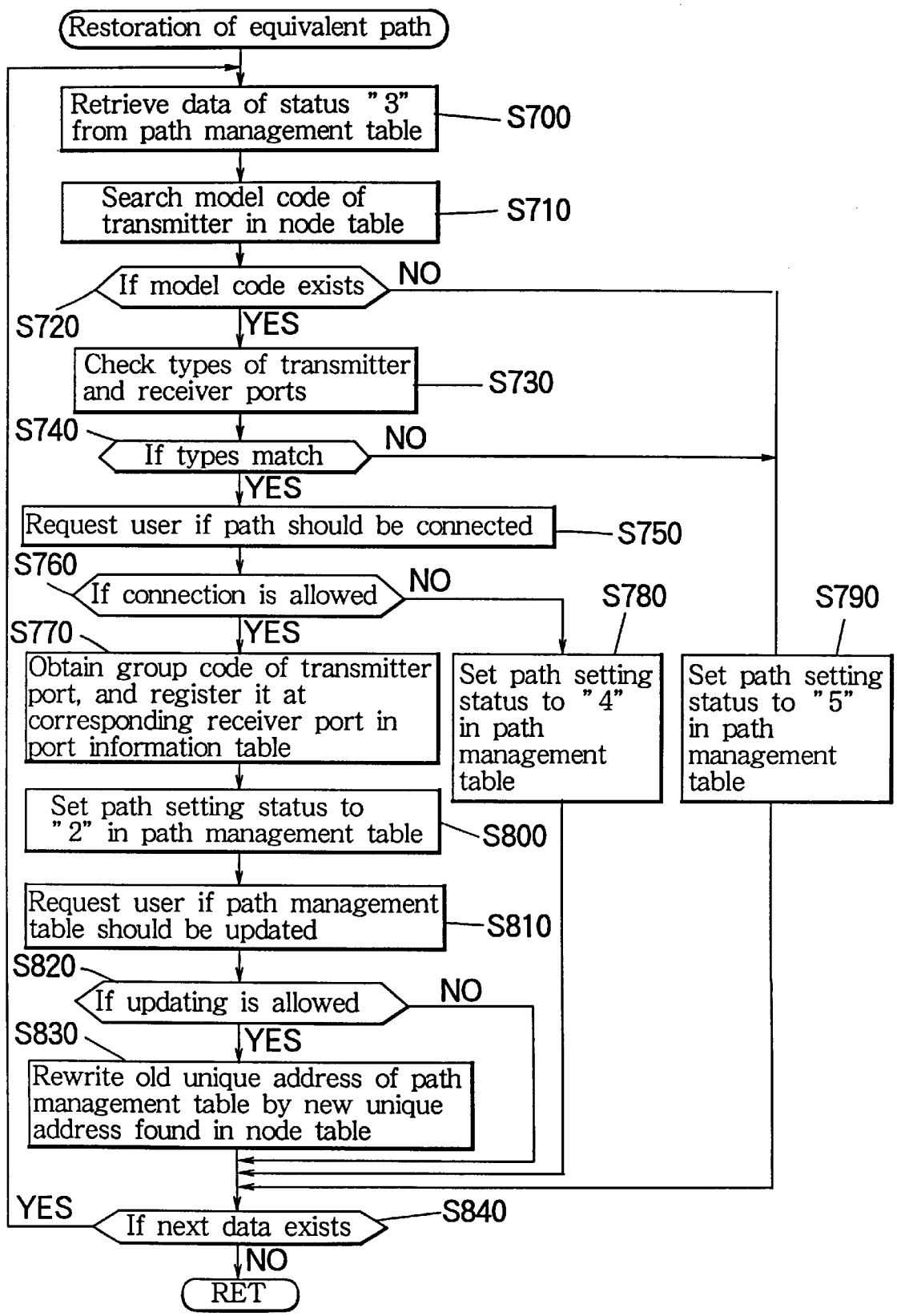
FIG. 11 is a flowchart showing an equivalent path restoration process.

Next, FIG. 11 shows an equivalent path restoration process which is executed in case that the logical path is not established in the path restoration process. When the equivalent path restoration process in commenced, Step S700 is undertaken to retrieve a data set having the status "3" from the path management table. For example, in case of the path management table shown in FIG. 8, the data set of the receiver port *5 is retrieved, which indicates a model code "FFFFFFFF" of a receiving member. Then, Step S710 is undertaken to search the node table shown in FIG. 5 to find a node member having the model code "FFFFFFFF". In this example, since the node member 6 has the model code "FFFFFFFF", Step S720 judges YES to thereby advance to Step S730. In this step, types of the receiver and transmitter ports are examined in manner similar to Step S630. Further, Step S740 is undertaken to check as to if the types of the receiver and transmitter ports are matched with each other. In this process, no check is made as to an existence of a corresponding port in the transmitting node member. This is because that the searched transmitter member of the specified model code has the same function as that of a missing transmitter member, and therefore the searched transmitter member may have a corresponding transmitter port. Alternatively, check may be made as to the existence of the corresponding port.

Next, Step S750 is undertaken to issue a first request to a user if an equivalent path should be connected. Upon permission of the path connection by the user, Step S760 judges YES to allow the equivalent path connection. Then, Step S770 is undertaken to obtain the group code of the transmitter port. The group code is registered in the port information table of the receiving node member. Further, Step S800 is undertaken to set the path setting status to "2" in the path management table. As shown in FIG. 9, the status "2" indicates the temporary path connection under the request. Then, Step S810 is undertaken to issue a second request to the user as to if the path management table should be updated. Upon permission by the user, Step S820 judges YES to allow the updating of the path management table. Subsequently in Step S830, the original unique address "ffff ffff" of the transmitter port is replaced by an actual unique address "ffff abcd" in the path management table. The equivalent path is temporarily connected in Step S770. Further, Step S830 is undertaken to update the path management table so as to fix the temporary path connection in case that the substitute equipment is permanently connected to the network system. Unless the path management table is updated, the user must respond to a first request for permission of the path connection whenever the network system is activated.

On the other hand, Step S790 is undertaken to set the path setting status to "5" indicative of a path connection unable state in case that Step S720 fails to find the desired model code of the transmitter member in the node table, or in case that Step S740 judges mismatching between the receiver and transmitter ports. Further, if Step S760 judges that the user does not permit the temporary path connection, Step S780 is undertaken to set the path setting status to "4" which indicates a path disconnection state under request. Thereafter, Step S840 is undertaken to check as to if a next data set exists in the path management table, if Step S820 judges that the user does not permit the updating, or Steps S780, S790 and S830 finish their processes. If the check result of Step S840 is found YES, the routine backs to Step S700 to repeat the equivalent path restoration process for the next data set. On the other hand, if Step S840 is found NO, the routine simply returns. By executing the equivalent path restoration process, the original path management table of the mixer shown in FIG. 8 is rewritten into the updated path management table as shown in FIG. 12, where the unique address of the transmitter port corresponding to either of the receiver ports *5 and *6 is replaced by the actual and substitutional unique address "ffff abcd".

Figure 13:
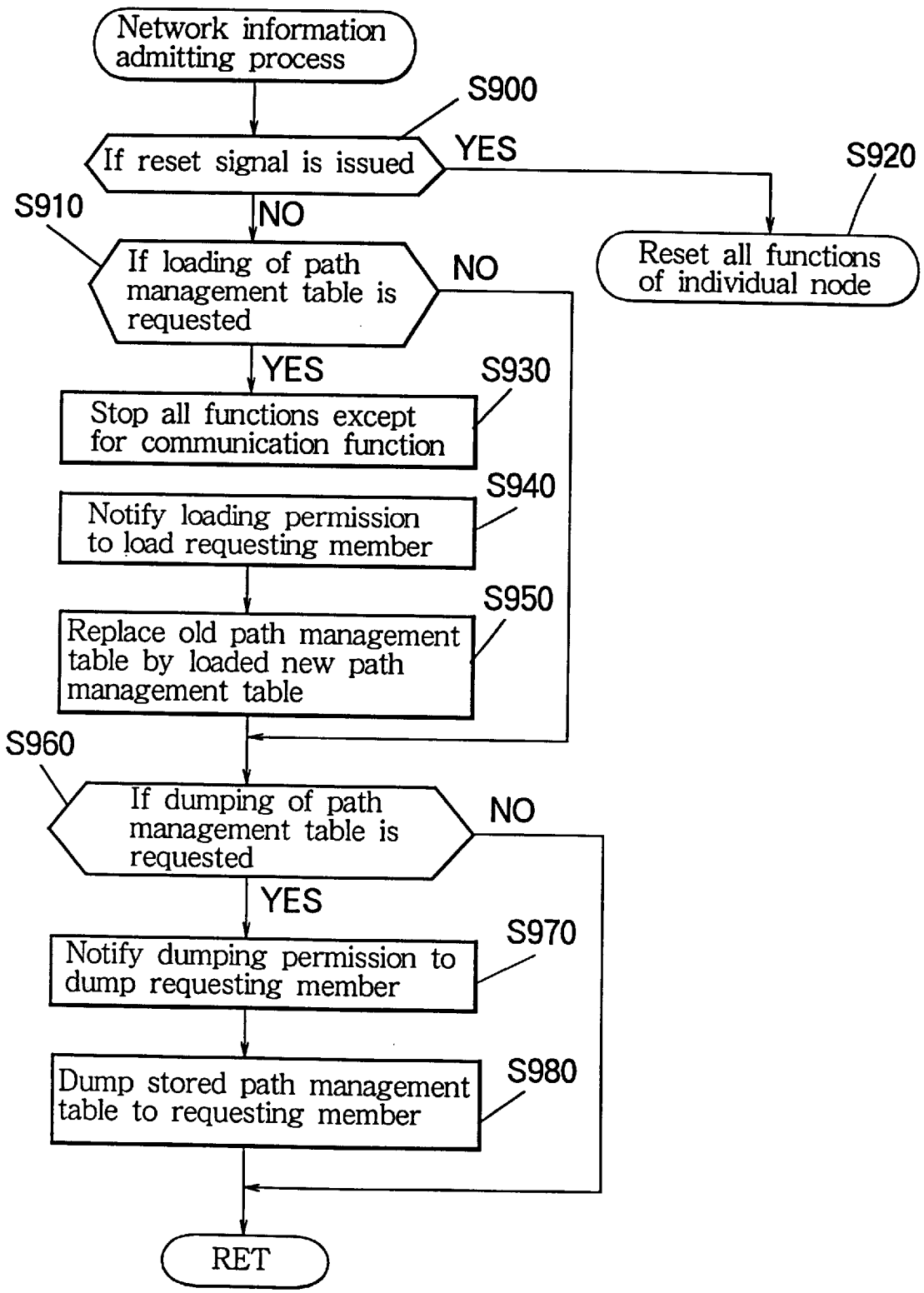
FIG. 13 is a flowchart showing a network information admission process.

Next, FIG. 13 shows details of the network information admitting process executed at the Step S140 of the main routine. When the network information admitting process is commenced, Step S900 is undertaken to check as to if network information fed from the network indicates a reset signal. In case of YES, Step S920 is undertaken such that the individual node member resets all of its functions or operations. The reset signal is issued to reset the network when a new member is introduced into a node of the network. As described before with reference to FIG. 1, the individual node member is operated by the application program and the port program, which are separate from each other. Therefore, the port program alone could be reset. However, in such a case, if the reset signal originates from an end of the network, the reset signal may clash with a data issued from another node within the network due to a transfer delay or else, thereby causing destructive running such as abnormal continuous tone generation. In view of this, all of the functions are reset in this embodiment to avoid destructive running.

If Step S900 judges that the admitted network information is not a reset signal, subsequent Step S910 is undertaken to check as to if the admitted network information indicates a request for loading of a path management table. Steps of S910–S950 are conducted so as to construct the logical paths according to a path management table stored in an external floppy disk. Namely, the load request is issued to rewrite the initial pass management tables installed in the individual node members, into new pass management tables stored in the floppy disk or something else. Therefore, if Step S910 judges that the admitted network information indicates a request for loading of the pass management table, subsequent Step S930 is undertaken so that the individual node member stops its own functions except for a communication function. The node member stops not only the operations but also the functions in order to block unnecessary restoration of the logical paths. For example, the node of the tone generator stops all of generating tones. The node of the sequencer stops record and reproduction of musical data.

Next, Step S940 is undertaken to notify a loading permission to a particular node member which is a network management unit which issues the load request. Next, Step S950 is undertaken to replace the old path management table by the new path management table transferred from the network management unit. By this, new logical paths are constructed by the new path management table. Then, the routine advances to Step S960 as in the case where Step S910 judges that the admitted information is not the load request for the path management table.

Steps S960–S980 are undertaken to carry out a dump process of the path management table into a floppy disk or other memory media. Step S960 is undertaken to check as to if the received network information indicates the dump request of the path management table. In case of YES, Step S970 is undertaken so that the individual node member notifies a dump permission to the requesting network management member. Further, Step S980 is undertaken such that the individual node member dumps its own path management table to the dump requesting member. The requesting member of the network management unit collects the path management tables from all of the node members, and records the collected information into a floppy disk or else. Then, the routine returns as in the case where Step S960 judges that the information admitted from the network is not the dump request for the path management table.

Figure 14:
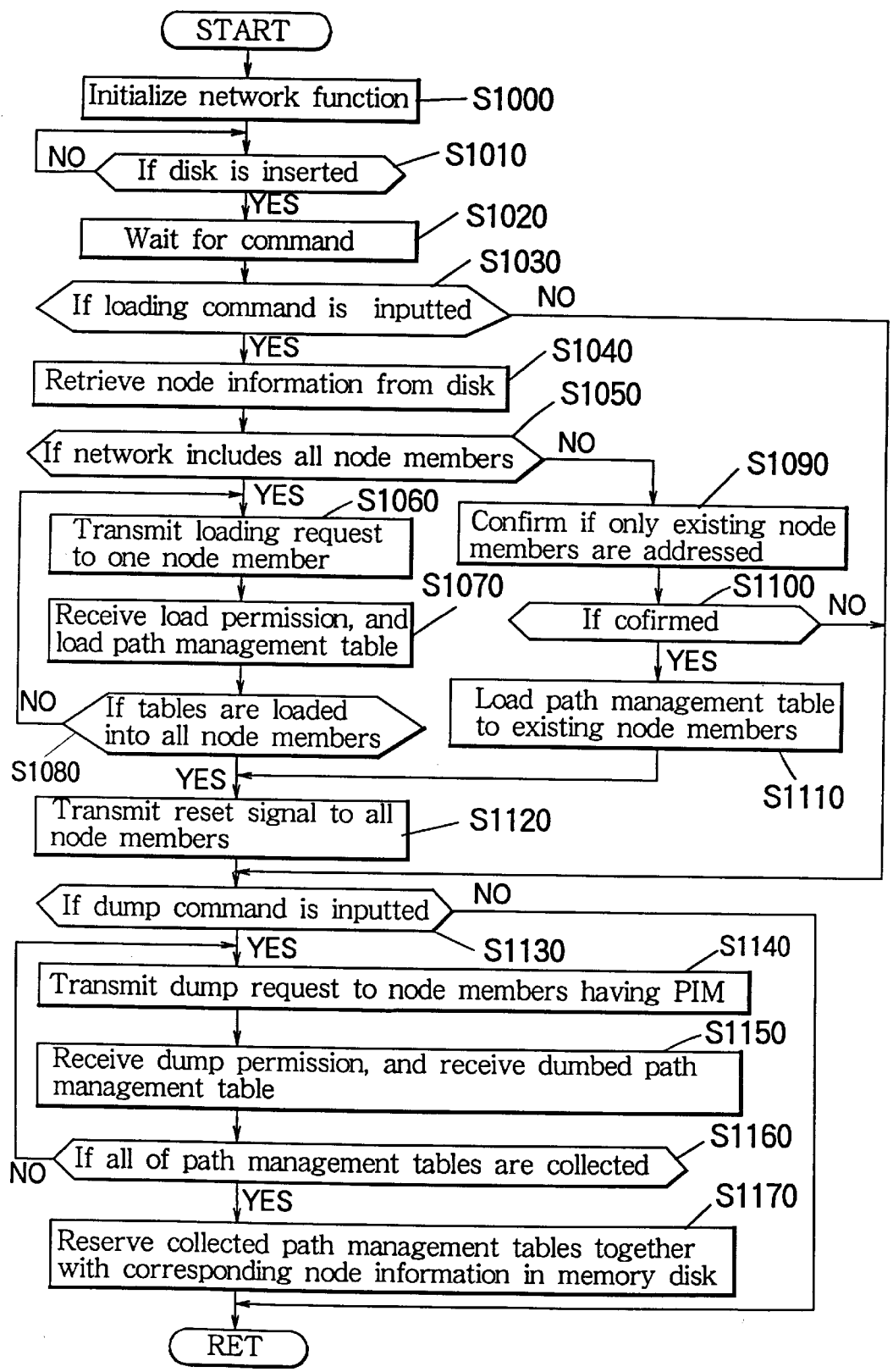
FIG. 14 is a flowchart showing operation of a network management member of the network system.

FIG. 14 shows operation executed by the network management unit. Upon power-on to activate the network management unit, Step S1000 is undertaken such that the network management unit initializes its own network function in similar manner as other node members. The initialization of the network function is conducted similarly as the FIG. 4 process. However, the network management unit does not need its own path management table so that the routine of FIG. 4 branches from Step S380 to return, since the check result of Step S380 is held NO. Referring back to FIG. 14, Step S1010 is undertaken to detect if a floppy disk or else is inserted into the network management unit. This detection is periodically effected until a floppy disk is inserted. Then, Step S1020 is undertaken to wait for a command input. Further, Step S1030 is undertaken when a command is inputted to check as to if the inputted command indicates a load command of new path management tables rather than a dump command. In case of YES, Step S1040 is undertaken to read out from the floppy disk node information which identifies each node member in terms of a unique address, a function label and a model code. Then, Step S1050 is undertaken to check as to if the network involves all the node members identified by either of the unique address and the model code. In this case, the check is made not only by the unique address but also by the model code, since the network may not involve an exact equipment but may involve a functionally equivalent equipment which has a different unique address but has the same model code as that of the exact equipment. In case of YES, the routine advances from Step S1050 to Step S1060 where a request for loading of a path management table is transmitted to one of the node members. Further, Step S1070 is undertaken to receive therefrom a load permission. Thereafter, the path management table is loaded into the responding node member. Then, Step S1080 is undertaken to check as to if the individual path management tables are loaded into all of the node members. If NO, the routine returns to Step S1060 to repeat the loading operation until all of the node members receive the respective path management tables. By such a manner, all of the node members receive their path management tables. Then, Step S1120 is undertaken to issue a reset signal to all of the node members to reset the same.

On the other hand, if the check result of Step S1050 shows that all of the listed node members identified by the node information are not found in the network, Step S1090 is undertaken to confirm if only the existing members should be addressed. When Step S1100 detects a permission for such a selective addressing, Step S1110 is undertaken to download the individual path management tables successively to only the existing node members. Then, Step S1120 is undertaken to transmit a reset signal to all of the node members to reset the same.

Next, Step S1130 is undertaken to check as to if the inputted command indicates a dump process of the path management tables, if Step S1030 judges that the inputted command does not indicate the loading process, or if Step S1100 judges that the user does not permit the selective loading of the path management tables to the existing node members. In case of YES, subsequent Step S1140 is undertaken to send a dump request to node members which have a path information manager (PIM). Then, Step S1150 is undertaken to receive a dump permission from these node members. Further, the network management unit collects the path management tables dumped from these node members. Then, Step S1160 is undertaken to check as to if the network management unit safely receives all of the path management tables from the responding node members. In case of NO, the routine returns to Step S1140 to repeat the dump process until the network management member receives the path management tables from all of the attending node members. After this, Step S1170 is undertaken to reserve the collected path management tables in the floppy disk together with the associated node information, thereby returning.

Figure 15A:
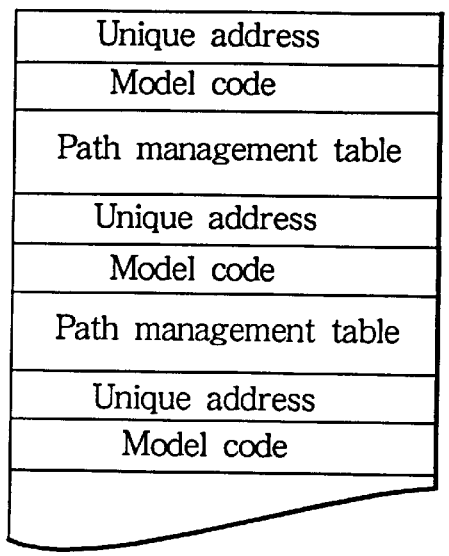
FIGS. 15A and 15B show examples of a data format reserved in a floppy disk.
Figure 15B:
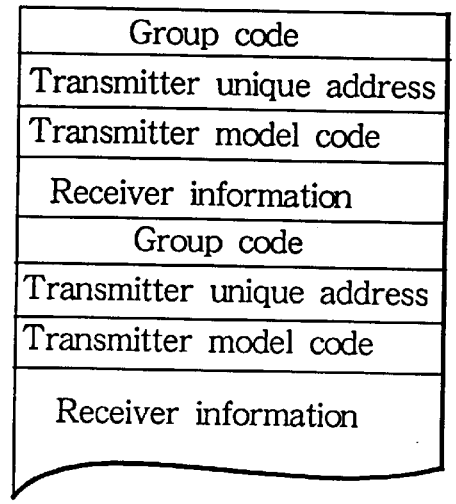

In the dump process, the floppy disk is used for recording the collected table data. A hard disk or an optical disk may be used instead of the floppy disk. FIG. 15A shows one example of a data format recorded in the floppy disk. In this data format, each path management table is recorded a node by node basis, which is labeled by the unique address and the model code. Alternatively, as shown in FIG. 15B, the data is recorded by a node by node basis, which contains a group code, a unique address of a transmitter member, a model code of a transmitter member and information of a receiving member.

Figure 16:
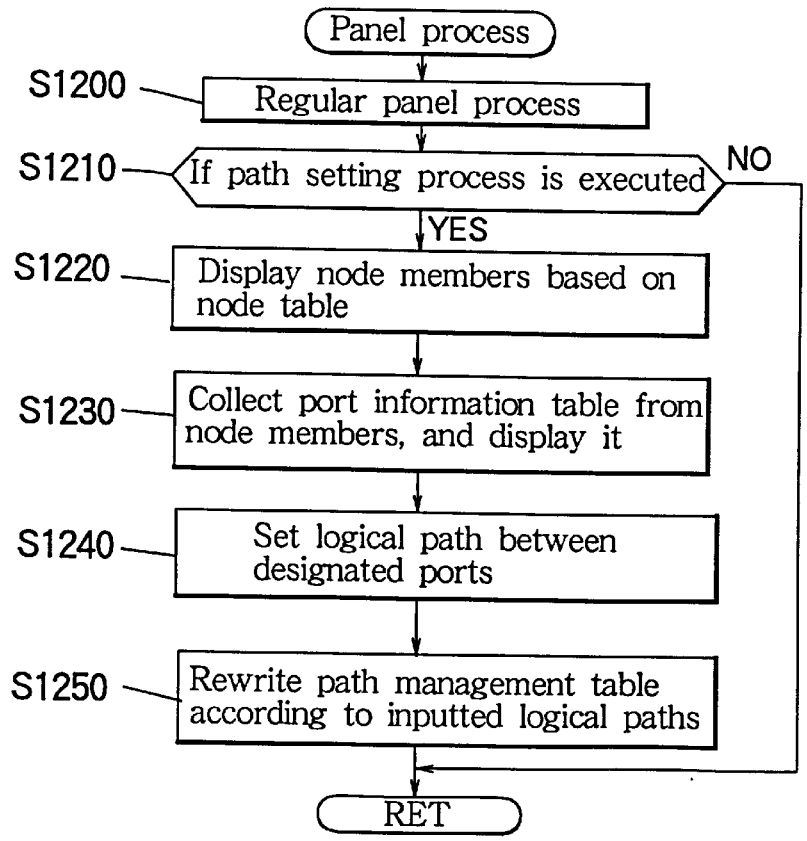
FIG. 16 is a flowchart showing a panel process executed by each node member.

Lastly, FIG. 16 shows a detail of the panel process executed by the Step S160 of the main routine. This process includes an initial path setting process and a regular panel process. First, Step S1200 is undertaken to carry out the regular panel process. Next, Step S1210 is undertaken to check as to if a path setting process should be executed. In case of YES, Step S1220 is undertaken to display all the node members involved in the network system according to the node table. Further, Step S1230 is undertaken to collect individual port information tables from the respective node members, since the node table does not contain any port information. The collected port information is also displayed. Then, Step S1240 is undertaken such that the user sets a desired logical path between selected ports while monitoring displayed information. This logical path settings may be conducted such that a single receiver port is connected to multiple transmitter ports while a group code of the transmitter ports is acknowledged and stored by the receiver port. Further, Step S1250 is undertaken to rewrite the path management tables based on the inputted logical paths. Then, the routine returns as in the case where Step S1210 judges that the path setting process is not called.

Summarization is given hereinbelow for the restoration of the logical paths carried out in the above described first embodiment of the network system. First, each transmitting member determines a group code for own respective transmitter ports. The group code is assigned to a data packet broadcasted from the respective transmitter port for identification purpose. Second, each receiving member requests a transmitting member having a corresponding transmitter port to pass a group code assigned thereto. Third, each receiving member registers the passed group code into the port information table by rewriting the same. Fourth, the receiving member receives a data packet broadcasted from the transmitting member if the group code attached to the data packet is identical to the group code registered in the port information table. However, in this procedure, each receiving member individually inquires group codes to the transmitting members. This would heavily increase data traffics if there are many receiving nodes in the network system.

A second embodiment of the network system is deviced in order to avoid such a heavy data traffic. In the second embodiment, the group code is exchanged as follows. First, each transmitting member determines a group code for each of own transmitter ports. Second, each transmitter member initially or provisionally broadcasts the determined group code together with an own unique address and an own transmitter port number. Third, each receiving member selectively receives and registers the group code according to the accompanying unique address and the port number if the group code is broadcasted from the corresponding transmitter port of the counterpart transmitting member, which is discriminated according to the accompanying unique address and the port number. Fourth, the receiving member receives any data packet broadcasted from the corresponding transmitter port of the counterpart member according to the group code provisionally registered in the own port information table.

Namely, the second embodiment is constructed such that the transmitting member initiatively broadcasts the group code to trigger the reconstruction of the logical paths, whereas the first embodiment is constructed such that the receiving member requests the transmitting member to pass the group code in order to trigger the reconstruction of the logical paths. Accordingly, the reconstruction is achieved by single broadcasting of the group codes in the second embodiment, thereby simplifying the communication procedure without increasing unnecessary data traffics.

Figure 17:
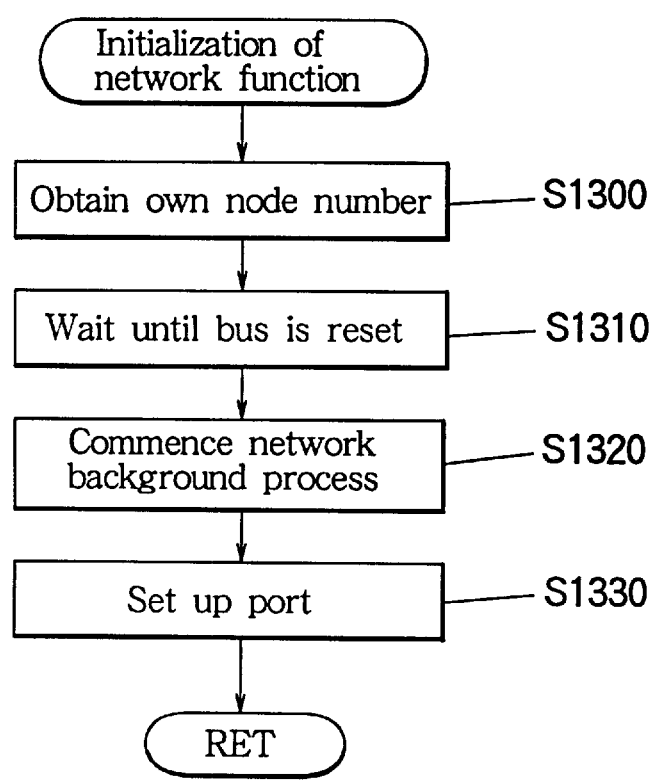
FIG. 17 is a flowchart showing network function initialization process in a second embodiment of the inventive network system.

Next, detailed description is given for the second embodiment with reference to flowcharts of FIGS. 17–20, where different points from the first embodiment are specifically described hereinafter. Generally, each electronic equipment such as a tone generator involved in the network system executes a main routine which is substantially the same as that shown in the flowchart of FIG. 2, except that a network initialization process is different than that executed in the Step S110 of the FIG. 2 flowchart. FIG. 17 is a flowchart showing a detail of the network initialization process, where the node table shown in FIG. 5 is not formed in contrast to the first embodiment. As shown in FIG. 17, when the network initialization process is commenced, the network is booted in Step S1300 so that each node obtains an own node number according to an installed algorithm of node number recognition. This node number is not a fixed one but is dynamically determined. Next, each node is placed in a waiting state in Step S1310 until the bus is reset. Namely, the respective nodes wait until the initiative node completes collection of the node number and other membership information of the involved nodes. Then, a network background process is commenced in Step S1320 as will be described in detail. Further, a port setup process is carried out in Step S1330 to set up ports in the respective nodes.

Figure 19:
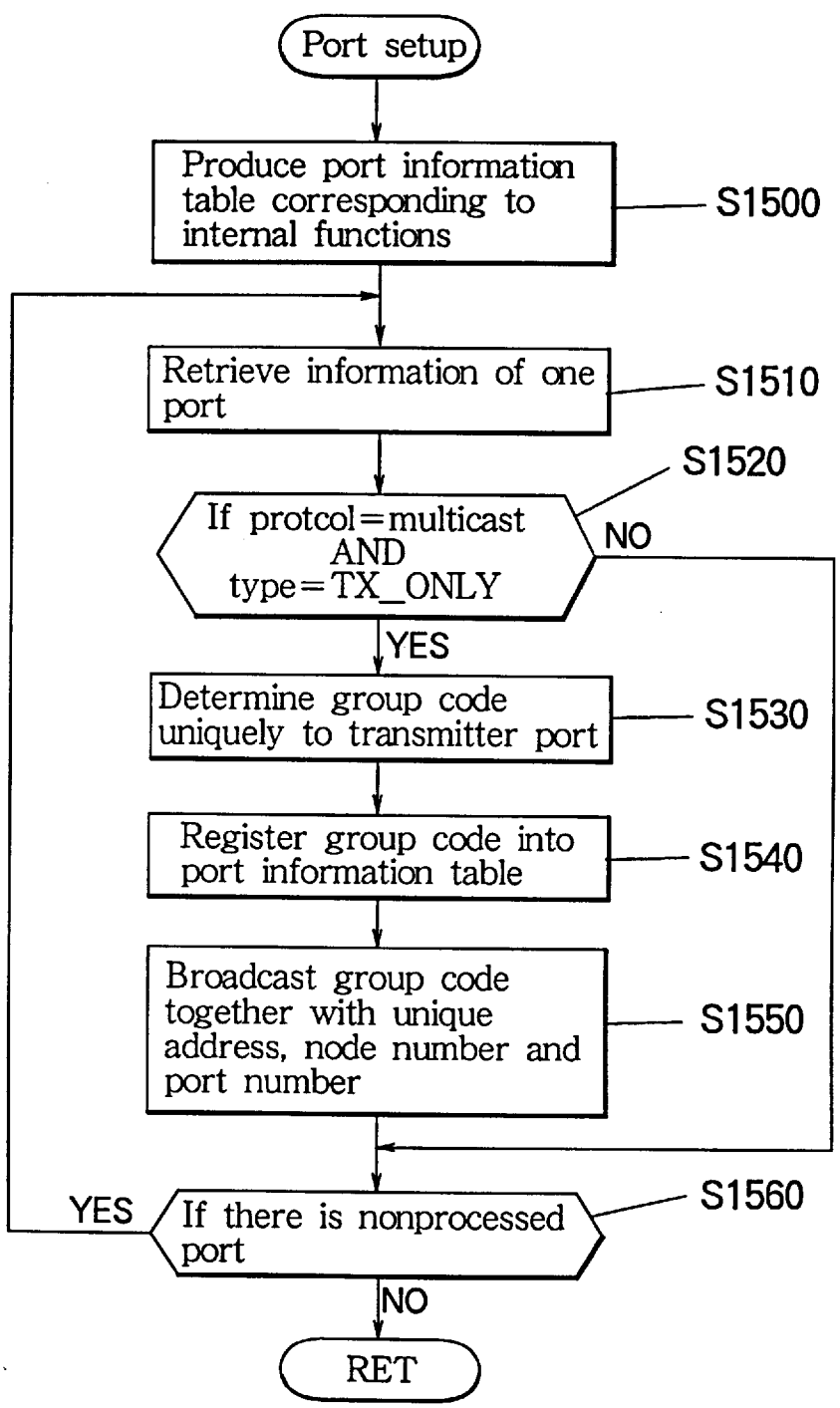
FIG. 19 is a flowchart showing port setup process in the second embodiment.

FIG. 19 is a flowchart showing the port setup process. When the port setup process is commenced, each node produces a port information table according to own internal functions in Step S1500. For example, a node of the sequencer produces the port information table as shown in FIG. 7. However, the group code is determined and assigned to transmitter ports according to the following steps. Namely, information of one port, for example, having a port number *1 is retrieved from the port information table in Step S1510. Step S1520 is undertaken to check as to if the protocol indicates "multicast" and the port type indicates "transmission only (TX_ONLY)" according to the retrieved information. In case of YES, Step S1530 is undertaken to assign an individual group code to that transmitter port of the multicast type. Further, Step S1540 is undertaken to register the acquired group code into the port information table. For example, as shown in FIG. 7, the port information table is filled with a group code "10" for the transmitter port *17 of the multicast protocol. Next, the node member broadcasts the group code together with the own unique address, the node number and the transmitter port number in Step S1550. By this, a counterpart receiving member can receive the broadcasted group code together with the unique address and the port number which specifies the corresponding transmitter port. Then, Step S1560 is undertaken to check as to if there still remains a nonprocessed port. In case of YES, the routine backs to Step S1510 to thereby repeatedly assign group codes to all of the transmitter ports of the multicast type. After all of the ports are processed, the check result of Step S1560 turns NO to thereby return. On the other hand, if the check result of Step S1520 is found NO, the routine jumps to Step S1560.

Figure 18:
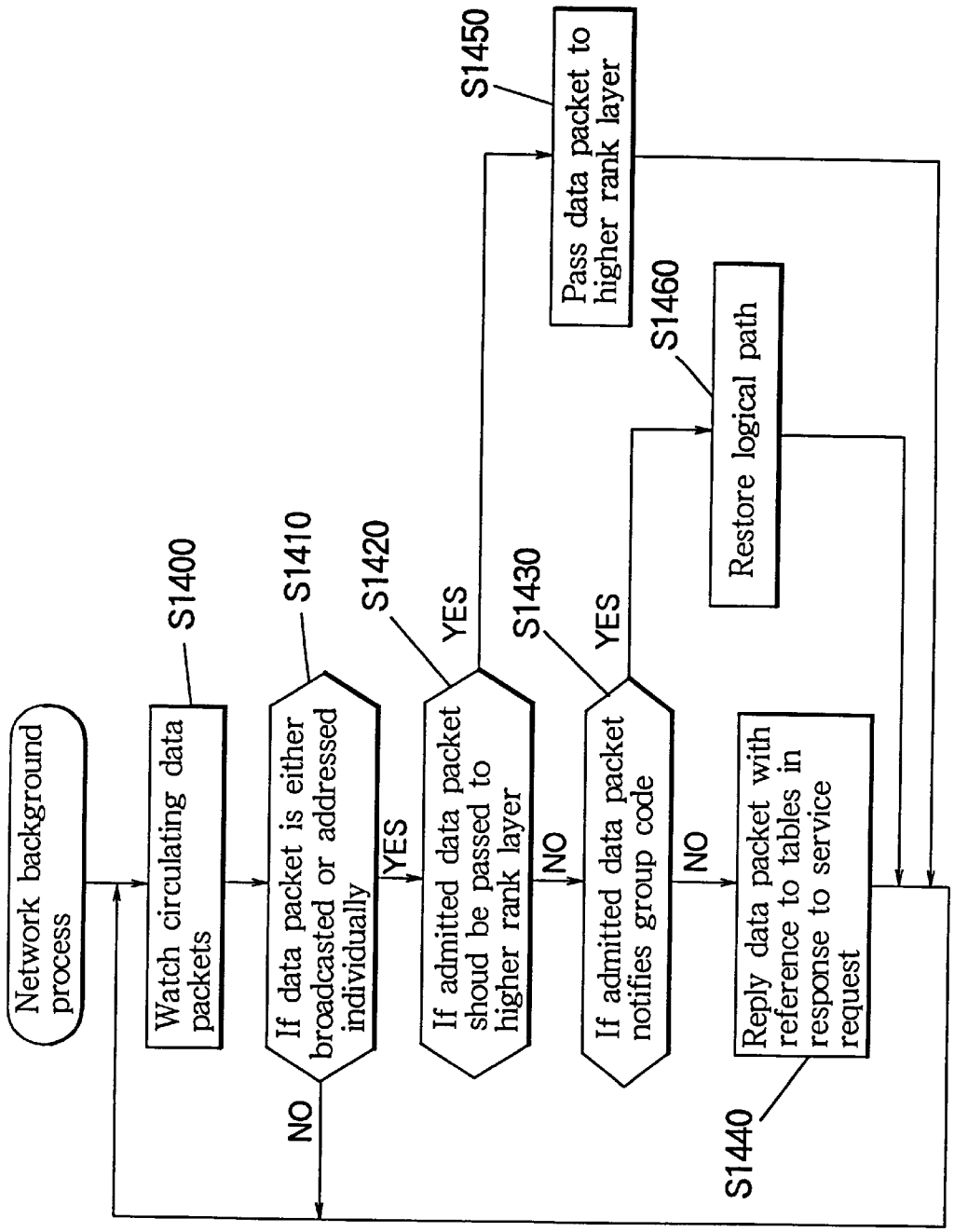
FIG. 18 is a flowchart showing network background process in the second embodiment.

Next, FIG. 18 is a flowchart showing details of the network background process executed in the Step S1320 of the routine of the network function initialization. When this network background process is commenced, Step S1400 is undertaken to watch circulating data packets. Further, Step S1410 is undertaken such that the individual member checks as to if the circulating data packet is either broadcasted and addressed thereto. In case of YES, subsequent Step S1420 is undertaken to check as to if the admitted data packet should be passed to a higher rank layer. In case of NO, subsequent Step S1430 is undertaken to check as to if the admitted data packet is broadcasted to notify a group code. If YES, Step S1460 is undertaken to carry out logical path restoration process according to the notifying data packet broadcasted at the Step S1550 of the port setup process. If NO, subsequent Step S1440 is undertaken such that the node member issues a reply data packet concerning itself with reference to various installed tables in response to a service demand contained in the received data packet. Particularly, the node member transmits a reply data packet in response to an inquiry demand concerning the port type for use in settings of logical paths, or in response to a user request for the port information table. On the other hand, if the check result of Step S1420 is found YES, Step S1450 is undertaken to pass the received data packet to the higher rank layer. Further, if the check result of Step S1410 is found NO, the process backs to Step S1400 as in the case where Step S1440, S1460 or S1450 is finished, thereby repeating the Steps S1400 through S1460 of the aforementioned background process.

Figure 20:
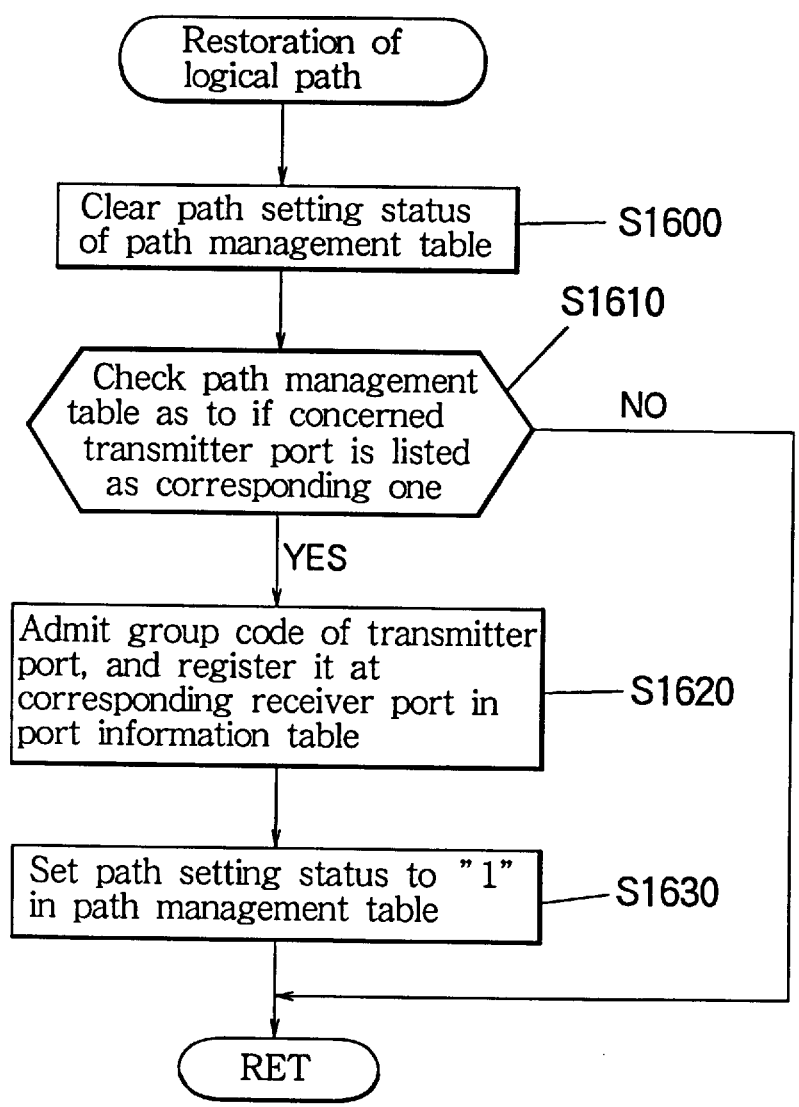
FIG. 20 is a flowchart showing path reconstruction process in the second embodiment.

Next, FIG. 20 shows details of the logical path restoration process or path opening process executed in the Step S1460 of the network background process. When this process is commenced, Step S1600 is undertaken such that the individual node member clears old path settings of its own path management table. For example, the mixer of the node member 3 has the path management table shown in FIG. 21A, and clears a path setting status at a rightmost column of the table in Step S1600. The path management table of FIG. 21A is different from FIG. 8 in that a column of transmitter model code is omitted because the functional or equivalent path reconstruction process is not adopted in this second embodiment. The following steps will be described specifically in conjunction with the path management table of FIG. 21A. Next, check is made in Step S1610 as to if a concerned transmitter port is listed as corresponding one in the path management table. Namely, the path management table is checked as to if the same lists information which coincides with the information of the transmitter port in terms of the transmitter unique address and the transmitter port number contained in the broadcasted data packet. If YES, Step S1620 is undertaken to admit and retrieve the group code contained in the data packet broadcasted from the concerned transmitter member. The group code is registered in the port information table of the receiving member for the corresponding receiver port. Then, Step S1630 is undertaken to set the path setting status to "1" in the path management table as shown in FIG. 21A. The status "1" indicates that the logical path setting is completed as shown in FIG. 21B. Then, the routine returns as in the case where the Step S1610 judges NO. The path setting status is held "0" in case that the receiving member fails to receive the group code broadcasted from the transmitting member. The status "0" indicates the connection unable state as shown in FIG. 21B.

As described above, in the second embodiment of the inventive network system, the transmitting member having a transmitter port of multicast protocol broadcasts the determined group code together with the unique address, the node number and the port number in a data packet at once. The receiving member obtains the group code from the data packet broadcasted from the corresponding transmitter port of the transmitting member. By this, the logical paths can be readily reconstructed by the simple data communication. However, the receiving member having the path information does not trigger the transmitting member in this embodiment, hence it would be difficult to recover failure of the path reconstruction. To avoid this, the transmitting member may repeatedly broadcast the group code several times. Alternatively, when the receiving member detects a nonestablished path which is given the status "0" in the path management table, the receiving member may request a counterpart transmitting member to broadcast the group code again after a period, or may broadcast a request for the reconstruction of the logical path.

In the disclosed embodiments, the network system is composed of electronic musical components to constitute a complex electronic musical instrument. However, the present invention is not limited to the electronic musical instrument, but may cover a variety of consumer electronic instruments, such as a network system involving a television set, a video tape recorder, an audio component and a karaoke machine.

As described above, according to the invention, the logical paths are restored to connect node members to reconstruct the network system based on logical path information stored in the node members. Therefore, the network system can be readily reconstructed once electronic components of the node members are physically disconnected from each other. For example, the network system composed of the electronic equipments can be transported in a disassembled state to a desired spot such as a public performance stage. Then, the electronic equipments are physically connected to a single and common cable line. Further, upon power-on or resetting, the logical paths are automatically restored to build up the network system such as a complex electronic musical instrument. Further, a substitute component can be equivalently connected to the network in place of a true component as far as the substitute component has the same function as that of the true component. Moreover, the logical path information is stored in a primary node member having a receiver port rather than a secondary node member having a transmitter port. Since the total data amount of the path information can be spread over the network system, the system can be booted quickly. Additionally, the logical path information can be reserved in a portable memory medium. The portable memory medium can be used commonly for separate locations such as studios installed with a group of similar electronic components or equipments. The memory medium is loaded into a network management unit involved in the group to thereby build up the same network system in different places. Further, in the inventive network system, the node members are not connected in series as opposed to a conventional MIDI network system. Therefore, if one node member is inadvertently disconnected from the network system, the remaining node members still safely receive a data without causing serious malfunctions.

What is claimed is:

1. A network system comprising: a plurality of electronic musical components; means for communicably and physically connecting the electronic musical components to one another to form a network; and means for providing path information effective to construct logical paths in the network, wherein each electronic musical component has at least either of a receiver port and a transmitter port, and wherein each of plural electronic musical components having a receiver port comprises means for memorizing the path information which specifies another electronic musical component having a corresponding transmitter port, and means operative when the electronic musical components are physically connected to one another to form the network for reconstructing a logical path which logically connects between the receiver port and the corresponding transmitter port according to the memorized path information, wherein the electronic musical components are integrated with one another by the logical paths to build up a complex electronic musical apparatus, and wherein the total path information is distributed over the plural electronic musical components having a receiver port such that each electronic musical component having a receiver port memorizes the path information which uniquely identifies another electronic musical component having the corresponding transmitter port.

2. A network system according to claim 1, wherein the means for providing path information comprises a portable memory medium which can be loaded into a particular one of the electronic components to provide thereto the path information, which is then distributed to each electronic component having a receiver port.

3. A network system according to claim 1, wherein the means operative when the electronic musical components are physically connected comprises search means, operative if said another electronic musical component having the corresponding transmitter port is not present in the formed network, for searching for a substitute electronic musical component according to the path information so as to reconstruct the logical path with the substitute electronic musical component.

4. A network system according to claim 3, wherein said search means comprises means, operative when the substitute electronic musical component is located, for issuing a message requesting confirmation whether the logical path should be reconstructed with the substitute electronic musical component.

5. A network system comprising: a plurality of electronic musical components; means for communicably connecting the electronic musical components to one another to form a network; and means for providing path information effective to construct logical paths in the network, wherein each electronic musical component has at least either of a receiver port and a transmitter port, and wherein an electronic musical component having a receiver port comprises means for memorizing the path information which specifies another electronic musical component having a corresponding transmitter port, and means for reconstructing a logical path which logically connects between the receiver port and the corresponding transmitter port according to the memorized path information, wherein the electronic musical components are integrated with one another by the logical paths to build up a complex electronic musical apparatus, wherein each electronic component having a transmitter port includes means for determining a group code which is assigned to a data packet broadcasted from each electronic component having a transmitter port, and wherein each electronic component having a receiver port includes means for requesting other electronic components having the corresponding transmitter port to pass the group code thereof, and means for registering the passed group code as a part of the path information so that each electronic component having a receiver port can receive a data packet broadcasted from electronic components having the corresponding transmitter port according to the group code.

6. A network system comprising: a plurality of electronic musical components; means for communicably connecting the electronic musical components to one another to form a network; and means for providing path information effective to construct logical paths in the network, wherein each electronic musical component has at least either of a receiver port and a transmitter port, and wherein an electronic musical component having a receiver port comprises means for memorizing the path information which specifies another electronic musical component having a corresponding transmitter port, and means for reconstructing a logical path which logically connects between the receiver port and the corresponding transmitter port according to the memorized path information, wherein the electronic musical components are integrated with one another by the logical paths to build up a complex electronic musical apparatus, wherein each electronic component having a transmitter port includes means for determining a group code which is assigned to an own data packet broadcasted from each electronic component having the transmitter port, and means for provisionally broadcasting the determined group code, and wherein each electronic component having a receiver port includes means for registering the broadcasted group code as a part of the path information if the group code is broadcasted from other electronic components having the corresponding transmitter port so that each electronic component having a receiver port can receive a data packet broadcasted from other electronic components having the corresponding transmitter port according to the group code.

7. A network system comprising: a plurality of electronic musical components; means for communicably and physically connecting the electronic musical components to build up a complex electronic musical apparatus; and providing means for providing path information effective to construct logical paths within the complex electronic musical apparatus, wherein each electronic musical component has at least either of a receiver port and a transmitter port, and wherein an electronic musical component having a receiver port comprises means for identifying another electronic musical component having a corresponding transmitter port according to the path information, and means operative when the electronic musical components are physically connected to one another to form the network for reconstructing a logical path which logically connects between the receiver port and the corresponding transmitter port, wherein the electronic musical components are integrated with one another by the logical paths to build up the complex electronic musical apparatus, and wherein the total path information is distributed over the plural electronic musical components having a receiver port such that each electronic musical component having a receiver port memorizes the path information which uniquely identifies another electronic musical component having the corresponding transmitter port.

8. A network system according to claim 7, wherein the providing means comprises a portable memory medium which can be loaded into a particular one of the electronic components to provide thereto the path information so as to reconstruct the logical paths.

9. A network system according to claim 7, wherein electronic components having the receiver port include means for memorizing the path information concerning its own receiver port and the corresponding transmitter port.

10. A network system comprising: a plurality of electronic musical components; means for communicably connecting the electronic musical components to build up a complex electronic musical apparatus; and providing means for providing path information effective to construct logical paths within the complex electronic musical apparatus, wherein each electronic musical component has at least either of a receiver port and a transmitter port, and wherein an electronic musical component having a receiver port comprises means for identifying another electronic musical component having a corresponding transmitter port according to the path information, and means for reconstructing a logical path which logically connects between the receiver port and the corresponding transmitter port, wherein the electronic musical components are integrated with one another by the logical paths to build up the complex electronic musical apparatus, wherein the electronic component having the receiver port includes means for memorizing the path information concerning its own receiver port and the corresponding transmitter port, wherein each electronic component having a transmitter port includes means for determining a group code which is assigned to a data packet broadcasted from each electronic component having the transmitter port, and wherein each electronic component having a receiver port includes means for requesting other electronic components having the corresponding transmitter port to pass the group code thereof, and means for registering the passed group code as a part of the path information so that each electronic component having the receiver port can receive a data packet broadcasted from electronic components having the corresponding transmitter port according to the group code.

11. A network system comprising: a plurality of electronic musical components; means for communicably connecting the electronic musical components to build up a complex electronic musical apparatus; and providing means for providing path information effective to construct logical paths within the complex electronic musical apparatus, wherein each electronic musical component has at least either of a receiver port and a transmitter port, and wherein an electronic musical component having a receiver port comprises means for identifying another electronic musical component having a corresponding transmitter port according to the path information, and means for reconstructing a logical path which logically connects between the receiver port and the corresponding transmitter port, wherein the electronic musical components are integrated with one another by the logical paths to build up the complex electronic musical apparatus wherein the electronic component having the receiver port includes means for memorizing the path information concerning its own receiver port and the corresponding transmitter port, wherein each electronic component having a transmitter port includes means for determining a group code which is assigned to a data packet broadcasted from each electronic component having a transmitter port, and means for provisionally broadcasting the determined group code, and wherein each electronic component having a receiver port includes means for registering the broadcasted group code as a part of the path information if the group code is broadcasted from other electronic components having the corresponding transmitter port so that each electronic component having the receiver port can receive a data packet broadcasted from other electronic components having the corresponding transmitter port according to the group code.

12. A network system which can be logically established according to path information to circulate data throughout a complex of electronic musical components which are communicably and physically connected to one another, the system comprising:

means programmed in each electronic musical component for forming therein either of a receiver port which receives data and a transmitter port which transmits data;

providing means for providing path information effective to enable a primary electronic musical component having a receiver port to identify a secondary electronic equipment having a corresponding transmitter port; and means programmed in the primary electronic musical component and operative when the electronic musical components are physically connected to one another to form the network for opening a logical path of the data connecting between its own receiver port and the corresponding transmitter port according to the provided path information to thereby enable circulation of the data throughout the complex of the electronic musical components;

wherein the electronic musical components are integrated with one another by the logical path to build up a complex electronic musical apparatus, and wherein the total path information is distributed over the plural electronic musical components having a receiver port such that each electronic musical component having a receiver port memorizes the path information which uniquely identifies another electronic musical component having the corresponding transmitter port.

13. A network system according to claim 12, wherein the primary electronic component has means for memorizing the provided path information to enable the same to restore a new logical path whenever an old logical path is reset.

14. A network system according to claim 12, wherein the providing means comprises a portable memory medium which can be loaded into one of the electronic components to enable the same to distribute the path information to other electronic components.

15. A network system according to claim 12, including means for selecting an initiative member from the complex of the electronic components such that the initiative member conducts an initialization work while communicating with the remaining members to recognize a membership of the electronic equipments.

16. A network system comprising:

means programmed in each electronic musical component for forming therein either of a receiver port which receives data and a transmitter port which transmits data;

providing means for providing path information effective to enable a primary electronic musical component having a receiver port to identify a secondary electronic equipment having a corresponding transmitter port; and means programmed in the primary electronic musical component for opening a logical path of the data connecting between its own receiver port and the corresponding transmitter port according to the provided path information to thereby enable circulation of the data throughout the complex of the electronic musical components;

wherein the electronic musical components are integrated with one another by the logical path to build up a complex electronic musical apparatus;

wherein the primary electronic component has means for memorizing the provided path information to enable the same to restore a new logical path whenever an old logical path is reset; and wherein each secondary electronic component includes means for determining a group code which is assigned to an own data broadcasted from an own transmitter port, and wherein each primary electronic component includes means for requesting other secondary electronic components to pass the group code thereof, and means for registering the passed group code as a part of the path information so that the primary electronic component can receive at an own receiver port the data broadcasted from the corresponding transmitter port of the secondary electronic component.

17. A network system comprising:

means programmed in each electronic musical component for forming therein either of a receiver port which receives data and a transmitter port which transmits data;

providing means for providing path information effective to enable a primary electronic musical component having a receiver port to identify a secondary electronic equipment having a corresponding transmitter port; and means programmed in the primary electronic musical component for opening a logical path of the data connecting between its own receiver port and the corresponding transmitter port according to the provided path information to thereby enable circulation of the data throughout the complex of the electronic musical components;

wherein the electronic musical components are integrated with one another by the logical path to build up a complex electronic musical apparatus;

wherein the primary electronic component has means for memorizing the provided path information to enable the same to restore a new logical path whenever an old logical path is reset; and wherein each secondary electronic component includes means for determining a group code which is assigned to data broadcasted from an own transmitter port, and means for provisionally broadcasting the determined group code, and wherein each primary electronic component includes means for registering the broadcasted group code as a part of the path information if the group code is broadcasted from the secondary electronic component having the corresponding transmitter port so that the primary electronic component can receive at an own receiver port the data broadcasted from the corresponding transmitter port of the secondary electronic component.

18. A method of reconstructing a logical network within a complex of electronic musical components which are physically connected to one another and each of which has at least either of a receiver port and a transmitter port, the method comprising:

a first step of providing path information to a primary electronic musical component having a receiver port to enable the same to identify a secondary electronic musical component having a corresponding transmitter port; and a second step of, when the electronic musical components are physically connected to one another to form the networks, restoring a logical path connecting between the receiver port and the corresponding transmitter port to thereby reconstruct the logical network, wherein the electronic musical components are integrated with one another by the logical path to build up a complex electronic musical apparatus, and wherein the total path information is distributed over the plural electronic musical components having a receiver port such that each electronic musical component having a receiver port memorizes the path information which uniquely identifies another electronic musical component having the corresponding transmitter port.

19. A method of reconstructing a logical network within a complex of electronic musical components which are physically connected to one another and each of which has at least either of a receiver port and a transmitter port, the method comprising:

a first step of providing path information to a primary electronic musical component having a receiver port to enable the same to identify a secondary electronic musical component having a corresponding transmitter port; and a second step of restoring a logical path connecting between the receiver port and the corresponding transmitter port to thereby reconstruct the logical network, wherein the electronic musical components are integrated with one another by the logical path to build up a complex electronic musical apparatus, wherein the second step includes determining a group code which is assigned to a data packet broadcasted from each secondary electronic component, triggering the primary electronic component to request the secondary electronic component having the corresponding transmitter port to pass the determined group code, and registering the passed group code in the primary electronic component so that the data packet broadcasted from the corresponding transmitter port of the secondary electronic equipment can be received at the receiver port of the primary electronic component according to the registered group code.

20. A method of reconstructing a logical network within a complex of electronic musical components which are physically connected to one another and each of which has at least either of a receiver port and a transmitter port, the method comprising:

a first step of providing path information to a primary electronic musical component having a receiver port to enable the same to identify a secondary electronic musical component having a corresponding transmitter port; and a second step of restoring a logical path connecting between the receiver port and the corresponding transmitter port to thereby reconstruct the logical network, wherein the electronic musical components are integrated with one another by the logical path to build up a complex electronic musical apparatus, wherein the second step includes determining a group code which is assigned to a data packet broadcasted from each secondary electronic component, triggering each secondary electronic component to provisionally broadcast the group code, and registering the group code in the primary electronic component if the group code received thereby is broadcasted from the secondary electronic component having the corresponding transmitter port so that the data packet broadcasted from the corresponding transmitter port of the secondary electronic component can be received at the receiver port of the primary electronic component according to the registered group code.

* * * * *